United States Patent
Lee et al.

(10) Patent No.: US 10,602,411 B2
(45) Date of Patent: Mar. 24, 2020

(54) REDIRECTION IN A NEUTRAL-HOST NETWORK

(71) Applicant: QUALCOMM Incorporated, San Diego, CA (US)

(72) Inventors: Jangwon Lee, San Diego, CA (US); Nam Soo Park, San Diego, CA (US); Rajat Prakash, San Diego, CA (US); Neil C. Carlson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 14/790,979

(22) Filed: Jul. 2, 2015

(65) Prior Publication Data
US 2017/0006513 A1    Jan. 5, 2017

(51) Int. Cl.
| | | |
|---|---|---|
| *H04W 36/14* | (2009.01) | |
| *H04W 48/18* | (2009.01) | |
| *H04W 36/00* | (2009.01) | |
| *H04W 36/02* | (2009.01) | |
| *H04W 84/04* | (2009.01) | |
| *H04W 88/02* | (2009.01) | |
| *H04W 88/08* | (2009.01) | |

(52) U.S. Cl.
CPC ....... *H04W 36/14* (2013.01); *H04W 36/0016* (2013.01); *H04W 36/0088* (2013.01); *H04W 36/02* (2013.01); *H04W 48/18* (2013.01); *H04W 84/042* (2013.01); *H04W 88/02* (2013.01); *H04W 88/08* (2013.01)

(58) Field of Classification Search
CPC .............................. H04W 36/14; H04W 36/02
USPC .......................................................... 455/436
See application file for complete search history.

(56) References Cited

U.S. PATENT DOCUMENTS

| | | | |
|---|---|---|---|
| 2006/0245392 A1 | 11/2006 | Buckley et al. | |
| 2011/0122801 A1 | 5/2011 | Franklin et al. | |
| 2012/0077501 A1* | 3/2012 | Zhang ................... | H04L 9/0869 455/436 |
| 2013/0017805 A1* | 1/2013 | Andre-Jonsson ......................... | H04W 36/0066 455/411 |
| 2013/0183981 A1 | 7/2013 | Singh et al. | |
| 2014/0051443 A1 | 2/2014 | Diachina et al. | |

(Continued)

FOREIGN PATENT DOCUMENTS

| | | |
|---|---|---|
| WO | WO-2013192108 A2 | 12/2013 |
| WO | 2014048288 A1 | 4/2014 |

OTHER PUBLICATIONS

Partial International Search Report—PCT/US2016/034391—ISA/EPO—dated Jul. 19, 2016.

(Continued)

*Primary Examiner* — Chuck Huynh
(74) *Attorney, Agent, or Firm* — Austin Rapp

(57) ABSTRACT

A method for redirecting a user equipment (UE) from a first network to a second network is described. The method includes determining, at a wireless access point of the first network, information for the UE about one or more mobile network operator (MNO) networks. The method also includes selecting the second network for redirection from among the one or more MNO networks based on the determined information. The method further includes sending the UE a redirection message that redirects the UE from the first network to the second network.

37 Claims, 16 Drawing Sheets

(56) References Cited

U.S. PATENT DOCUMENTS

| | | | | |
|---|---|---|---|---|
| 2014/0213219 A1* | 7/2014 | Mohebbi | ............... | H04W 92/02 455/411 |
| 2014/0213258 A1* | 7/2014 | Dahlen | ............. | H04W 36/0083 455/436 |
| 2014/0228031 A1* | 8/2014 | Masini | .............. | H04W 36/0083 455/436 |
| 2014/0348062 A1* | 11/2014 | Anwar | .................. | H04W 28/08 370/328 |
| 2015/0172965 A1* | 6/2015 | Jeong | .................... | H04W 36/14 370/331 |

OTHER PUBLICATIONS

International Search Report and Written Opinion—PCT/US2016/034391—ISA/EPO—dated Sep. 7, 2016.
3GPP TS 25.331: "Universal Mobile Telecommunications System (UMTS); Radio Resource Control (RRC), Protocol specification", ETSI TS 125 331 version 12.4.0, Release 12, 2015, 2246 pages.
3GPP TS 36.306: "LTE; Evolved Universal Terrestrial Radio Access (E-UTRA); User Equipment (UE) Radio Access Capabilities", ETSI TS 136 306 Version 12.4.0 Release 12, 2015, 43 pages.
EVENTHELIX.COM Inc., "LTE X2 Handover Messaging", 2013, 13 pages.
nCore Communications "LTE-over-WiFi Small Cell Solution," [Retrieved dated on Jan. 2, 2015], Retrieved from the Internet URL: https://sites.google.com/a/ncorecommunications.com/ncore-communications/lte-over-wifi >, 3 pages.
European Search Report—EP18198704—Search Authority—Munich—dated Nov. 30, 2018.

* cited by examiner

REDIRECTION IN A NEUTRAL-HOST NETWORK

INTRODUCTION

The present disclosure relates generally to the field of communications, and more specifically, to redirecting a user equipment from a first network to a second network.

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmission power, etc.). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as 3rd Generation Partnership Project (3GPP), 3GPP Long-Term Evolution (LTE), Ultra Mobile Broadband (UMB), Evolution Data Optimized (EV-DO), etc.

Generally, wireless multiple-access communication systems may simultaneously support communication for multiple devices. Each device may communicate with one or more base stations via transmissions on forward and reverse links. The forward link (or downlink) refers to the communication link from base stations to devices, and the reverse link (or uplink) refers to the communication link from devices to base stations. Further, communications between devices and base stations may be established via single-input single-output (SISO) systems, multiple-input single-output (MISO) systems, multiple-input multiple-output (MIMO) systems, and so forth. In addition, devices can communicate with other devices (and/or base stations with other base stations) in peer-to-peer wireless network configurations.

In some instances, a device associated with a mobile network operator (MNO) may connect to a neutral-host (NH) network. Because the NH network may be separate from a network operated by the MNO, handover from the NH network to the MNO network may be unsupported. Thus, redirecting the device from the NH network to the MNO network may be beneficial.

SUMMARY

A method for redirecting a user equipment (UE) from a first network to a second network is described. The method includes determining, at a wireless access point of the first network, information for the UE about one or more mobile network operator (MNO) networks. The method further includes selecting the second network for redirection from among the one or more MNO networks based on the determined information. The method additionally includes sending the UE a redirection message that redirects the UE from the first network to the second network.

Determining information for the UE about the one or more MNO networks may include receiving a message from the UE that includes a public land mobile network identifier (PLMN ID) of the second network and maintaining a mapping between the UE and the PLMN ID of the second network. The message may comprise a UE capability information message. The UE capability information message may include band information of the second network. Selecting the second network for redirection from among the one or more MNO networks may comprise selecting the second network based on the received PLMN ID.

Determining information for the UE about the one or more MNO networks may include receiving, from the UE, handover information regarding a previously visited network of the UE, extracting information about a MNO network from the handover information, and maintaining a mapping between the UE and the extracted information.

Determining information for the UE about the one or more MNO networks may include receiving a handover request from the second network when the UE moves from the second network to the first network, extracting information about a MNO network from the handover request, and maintaining a mapping between the UE and the extracted information.

Determining information for the UE about the one or more MNO networks may include listening for messages broadcast by one or more neighboring wireless access points and identifying one or more of the one or more neighboring access points as macro access points based on whether a neighboring access point broadcasts a message that includes a physical cell identifier (PCI) that is within a range of PCIs associated with macro access points.

Determining information for the UE about the one or more MNO networks may include receiving a measurement report from the UE and determining information about one or more neighboring cells based on the measurement report.

Determining information for the UE about the one or more MNO networks may include provisioning the wireless access point with an operations and management (OAM) configuration file and determining band information regarding the one or more MNO networks based on the OAM configuration file.

Determining information for the UE about the one or more MNO networks may include receiving, at the wireless access point, information from the UE regarding the one or more MNO networks, determining, at the wireless access point, additional information about the one or more MNO networks, and combining the information from the UE with the additional information determined at the wireless access point. The information from the UE may include a PLMN ID for the second network. The additional information may comprise band information for the second network.

Selecting the second network from among the one or more MNO networks may comprise determining that the UE is associated with the second network based on the determined information.

The first network may include a neutral-host (NH) Long-Term Evolution (LTE) network.

A wireless access point is also described. The wireless access point includes an information determiner configured to determine information for a user equipment (UE) about one or more mobile network operator (MNO) networks. The wireless access point also includes a network selector configured to select a second network for redirection from among the one or more MNO networks based on the determined information. The wireless access point further includes a transceiver configured to send the UE a redirection message that redirects the UE from a first network to the second network.

Another wireless access point is described. The wireless access point includes means for determining information for a user equipment (UE) about one or more mobile network operator (MNO) networks. The wireless access point also includes means for selecting a second network for redirection from among the one or more MNO networks based on the determined information. The wireless access point additionally includes means for sending the UE a redirection message that redirects the UE from a first network to the second network.

A computer-readable medium is also described. The computer-readable medium includes codes for causing a computer to determine information for a user equipment (UE) about one or more mobile network operator (MNO) networks. The computer-readable medium further includes codes for causing the computer to select a second network for redirection from among the one or more MNO networks based on the determined information. The computer-readable medium also includes codes for causing the computer to send the UE a redirection message that redirects the UE from a first network to the second network.

A method for redirecting a user equipment (UE) from a first network to a second network is also described. The method includes sending a message to a wireless access point of the first network, wherein the message includes a public land mobile network identifier (PLMN ID) of the second network, and wherein the second network is one of one or more mobile network operator (MNO) networks available in a region. The method also includes receiving a redirection message from the wireless access point of the first network that redirects the UE from the first network to the second network, wherein the redirection message is based on the PLMN ID included in the message. The message may include a UE capability information message. The UE capability information message may include band information.

The method may further include sending, to the wireless access point, handover information regarding a previously visited network of the UE. The redirection message may further be based on the handover information.

The method may also include sending to the wireless access point a measurement report. The redirection message may further be based on the measurement report.

A user equipment (UE) is also described. The UE may include a transceiver configured to send a message to a wireless access point of a first network. The message may include a public land mobile network identifier (PLMN ID) of a second network. The second network may be one of one or more mobile network operator (MNO) networks available in a region. The transceiver may be further configured to receive a redirection message from the wireless access point of the first network that redirects the UE from the first network to the second network. The redirection message may be based on the PLMN ID included in the message.

Another user equipment (UE) is described. The UE may include means for sending a message to a wireless access point of a first network. The message may include a public land mobile network identifier (PLMN ID) of a second network. The second network may be one of one or more mobile network operator (MNO) networks available in a region. The UE may further include means for receiving a redirection message from the wireless access point of the first network that redirects the UE from the first network to the second network. The redirection message may be based on the PLMN ID included in the message.

A computer-readable medium is also described. The computer-readable medium may include codes for causing a computer to send a message to a wireless access point of a first network. The message may include a public land mobile network identifier (PLMN ID) of a second network. The second network may be one of one or more mobile network operator (MNO) networks available in a region. The computer-readable medium may further include codes for causing the computer to receive a redirection message from the wireless access point of the first network that redirects a user equipment (UE) from the first network to the second network. The redirection message may be based on the PLMN ID included in the message.

A method for redirecting a user equipment (UE) from a first network to a second network is also described. The method may include receiving, at the UE, a redirection message that redirects the UE from the first network to the second network. The method may further include determining, at the UE, band information for the second network. The method may also include redirecting to the second network based on the determined band information. The redirection message may include band information for each of a plurality of mobile network operator (MNO) partners of the first network. Determining the band information for the second network may be based on one or more of a configuration of the UE, a band support table, bands based on a location of the UE, and signal strength measurements.

A user equipment (UE) is also described. The UE may include a transceiver configured to receive, at the UE, a redirection message that redirects the UE from a first network to a second network. The UE may further include a band determiner configured to determine, at the UE, band information for the second network. The transceiver may be further configured to redirect the UE to the second network based on the determined band information.

Another user equipment (UE) is described. The UE may include means for receiving, at the UE, a redirection message that redirects the UE from a first network to a second network. The UE may further include means for determining, at the UE, band information for the second network. The UE may additionally include means for redirecting the UE to the second network based on the determined band information.

A computer-readable medium is also described. The computer-readable medium may include codes for causing a computer to receive, at a user equipment (UE), a redirection message that redirects the UE from a first network to a second network. The computer-readable medium may further include codes for causing the computer to determine, at the UE, band information for the second network. The computer-readable medium may additionally include codes for causing the computer to redirect the UE to the second network based on the determined band information.

DETAILED DESCRIPTION

Figure 1:
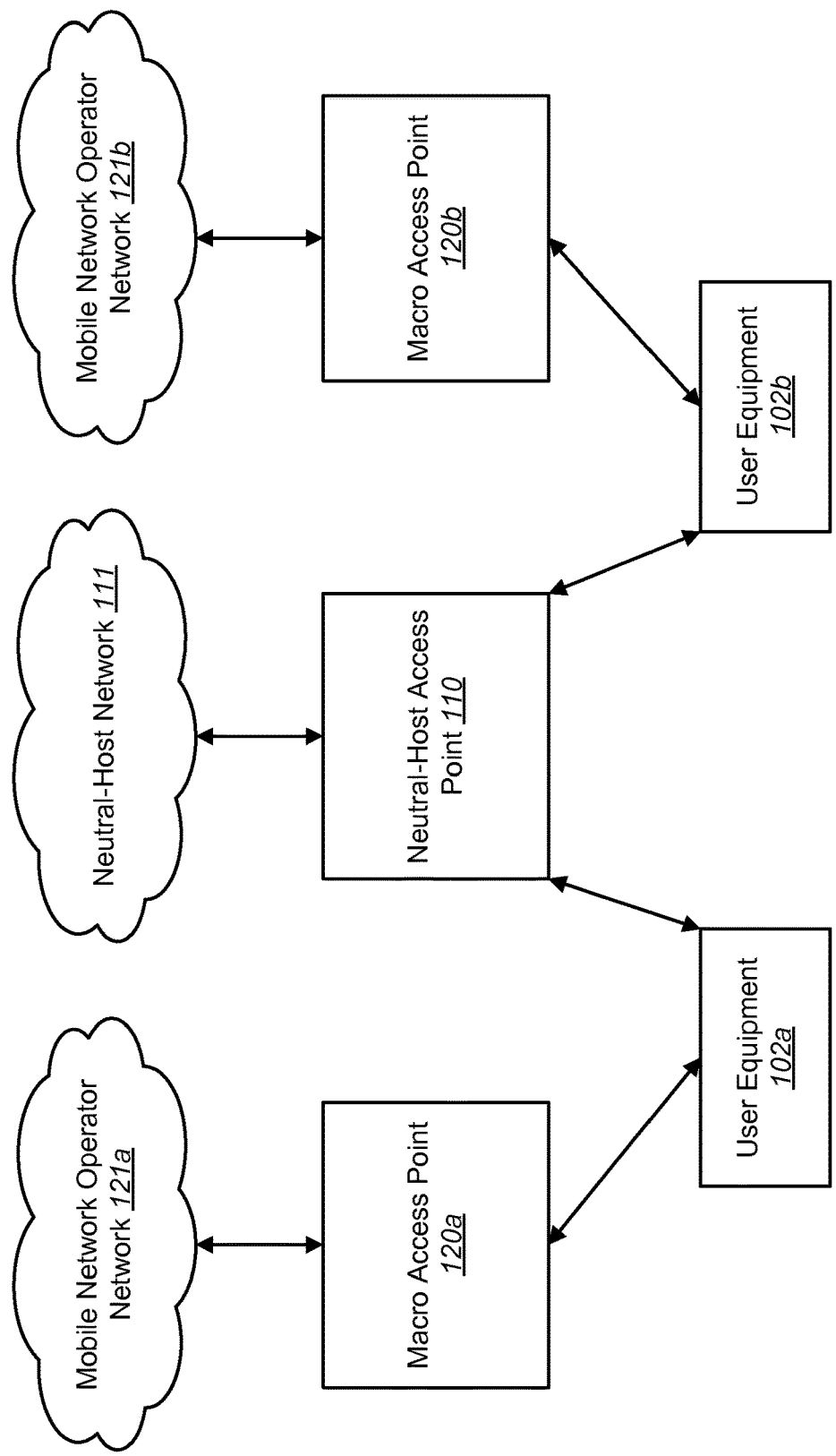
FIG. 1 illustrates one example of a wireless communication system.

Various aspects are now described with reference to the drawings. In the following description, for purposes of explanation, numerous specific details are set forth in order to provide a thorough understanding of one or more aspects. It may be evident that the one or more aspects may be practiced without these specific details.

In various aspects, systems and methods for redirecting a user equipment (UE) from a first network to a second network are described. The description may refer to a UE. A UE can also be called a system, mobile device, device, subscriber unit, subscriber station, mobile station, mobile, remote station, mobile terminal, remote terminal, access terminal, user terminal, terminal, communication device, user agent, or user device. A UE may be a cellular telephone, a satellite phone, a cordless telephone, a Session Initiation Protocol (SIP) phone, a wireless local loop (WLL) station, a personal digital assistant (PDA), a handheld device having wireless connection capability, a tablet, a computing device, an appliance, an automobile, an entertainment device, or other processing devices connected via a wireless modem to one or more wireless access points that provide cellular or wireless network access to the UE.

A wireless access point (AP) may be utilized for communicating with one or more UEs and may also be referred to as a base station (BS), an access point, femto node, a pico node, micro node, a Node B, evolved Node B (eNB), home Node B (HNB), or home evolved Node B (HeNB), collectively referred to as H(e)NB, or some other terminology. These wireless APs may be considered low-power base stations. For example, a low-power base station may transmit at a relatively low power as compared to a macro base station associated with a wireless wide area network (WWAN). As such, the coverage area of the low-power base station can be substantially smaller than the coverage area of a macro base station.

The techniques described herein may be used for various wireless communication systems such as CDMA, TDMA, FDMA, OFDMA, SC-FDMA, Wi-Fi carrier sense multiple access (CSMA), and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95, and IS-856 standards. A TDMA system may implement a radio technology such as Global System for Mobile Communications (GSM). An OFDMA system may implement a radio technology such as Evolved UTRA (E-UTRA), UMB, IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long-Term Evolution (LTE) is a release of UMTS that uses E-UTRA, which employs OFDMA on the downlink and SC-FDMA on the uplink. UTRA, E-UTRA, UMTS, LTE, and GSM are described in documents from 3GPP. Additionally, cdma2000 and UMB are described in documents from an organization named 3rd Generation Partnership Project 2 (3GPP2). Further, such wireless communication systems may additionally include peer-to-peer (e.g., mobile-to-mobile) ad hoc network systems often using unpaired unlicensed spectrums, 802.xx wireless LAN, Bluetooth, and any other short- or long-range, wireless communication techniques.

Various aspects or features will be presented in terms of systems that may include a number of devices, components, modules, and the like. It is to be understood and appreciated that the various systems may include additional devices, components, modules, etc., and/or may not include all of the devices, components, modules, etc. discussed in connection with the figures. A combination of these approaches may also be used.

FIG. 1 illustrates one example of a wireless communication system 100. The wireless communication system 100 may comprise user equipments (UEs) 102a-102b, neutral-host (NH) access point (AP) 110, macro APs 120a-120b, mobile network operator (MNO) networks 121a-121b, and NH network 111. The wireless communication system 100 may also comprise other devices that are not illustrated. In this example, UE 102a may communicate with macro AP 120a and NH AP 110 over one or more wireless links. In addition, UE 102b may communicate with macro AP 120b and NH AP 110 over one or more wireless links. Further, macro APs 120a and 120b may communicate with MNO networks 121a and 121b, respectively, over one or more wired or wireless links. NH AP 110 may communicate with NH network 111 over one or more wired or wireless links.

In an aspect, communications in the wireless communication system 100 may be achieved through transmissions over one or more wireless links. Such wireless links may be established via a single-input and single-output (SISO), multiple-input and single-output (MISO), or a multiple-input and multiple-output (MIMO) system. A MIMO system includes transmitter(s) and receiver(s) equipped, respectively, with multiple ($N_T$) transmit antennas and multiple ($N_R$) receive antennas for data transmission. In some configurations, the wireless communication system 100 may utilize MIMO. A MIMO system may support time division duplex (TDD) and/or frequency division duplex (FDD) systems.

In some configurations, the wireless communication system 100 may operate in accordance with one or more standards. Examples of these standards include Bluetooth (e.g., Institute of Electrical and Electronics Engineers (IEEE) 802.15.1), IEEE 802.11 (Wi-Fi), IEEE 802.16 (Worldwide Interoperability for Microwave Access (WiMAX)), Global System for Mobile Communications (GSM), Universal Mobile Telecommunications System (UMTS), CDMA2000, Long-Term Evolution (LTE), etc.

In some configurations, the wireless communication system 100 may be a multiple-access system capable of supporting communication with multiple devices by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, evolution-data optimized (EV-DO), single-carrier frequency division multiple access (SC-FDMA) systems, General Packet Radio Service (GPRS) access network systems, 3rd Generation Partnership Project (3GPP) Long-Term Evolution (LTE) systems, and spatial division multiple access (SDMA) systems.

A macro AP (e.g., macro AP 120*a* or macro AP 120*b*) may be associated with a mobile network operator (MNO) and may be part of an MNO network (e.g., MNO network 121*a* or MNO network 121*b*). An MNO may provide wireless communication services through an MNO network (e.g., MNO network 121*a* or MNO network 121*b*). The MNO network may include a spectrum allocation, network infrastructure, and backhaul infrastructure. A UE (e.g., UE 102*a* or 102*b*) may also be associated with (e.g., have a subscription to) the MNO and may receive wireless communication services through the MNO network via the macro AP (e.g., macro AP 120*a* or macro AP 120*b*).

In one example, UE 102*a*, macro AP 120*a*, and MNO network 121*a* may be associated with a first MNO, and UE 102*b*, macro AP 120*b*, and MNO network 121*b* may be associated with a second MNO. In this example, UE 102*a* may receive wireless communication services from the first MNO through macro AP 120*a* and other macro APs (not shown) in the MNO network 121*a* that are associated with the first MNO. In addition, UE 102*b* may receive wireless communication services from the second MNO through macro AP 120*b* and other macro APs (not shown) in the MNO network 121*b* that are associated with the second MNO.

A NH AP (e.g., NH AP 110) may be associated with a secondary access network (e.g., NH network 111) that is not part of an MNO network. A NH network may be considered a secondary access network because it may not be the primary network through which a device may receive wireless communication services. A NH AP may be capable of serving UEs (e.g., UE 102*a* and 102*b*) associated with different MNOs. For example, NH AP 110 may be capable of serving both UE 102*a* that is associated with the first MNO and UE 102*b* that is associated with the second MNO. Moreover, a NH AP may be capable of serving UEs that are not associated with any MNO.

In one configuration, a NH network may provide an Internet Protocol (IP) connection for connected devices such as UE 102*a* and UE 102*b*. In another configuration, a NH network may be an LTE-based wireless access network that operates in a licensed band, an unlicensed band, or a combination of both. The NH network may use Authentication, Authorization, and Accounting (AAA)-based authentication. The NH network may include an evolved packet data gateway (ePDG) to provide voice-over-IP connections.

A NH network (e.g., NH network 111) may comprise one or more NH APs that are managed by or have a roaming relationship with a NH network service provider. A NH network may be locally owned and operated, for example, by a cable operator or an enterprise, as a hotspot, or in a residence. In one configuration, a NH network may comprise a femto-cell network that allows access to UEs (e.g., UE 102*a* and UE 102*b*) from other MNOs. The femto cell network may be installed at a specific venue (e.g., a mall, a stadium, a neighborhood, a business, or a vehicle) and may provide enhanced coverage or capacity.

In one example, a NH network (e.g., NH network 111) may be used as an offload service for a MNO network. The MNO may enter into a wholesale deal with the NH network operator to provide wireless communication services to UEs (e.g., UE 102*a* or UE 102*b*) associated with the MNO (e.g., a UE with a subscription to the MNO network). In this scenario, a UE associated with the MNO may be authenticated to the NH network by the MNO via the NH network.

In another example, a NH network (e.g., NH network 111) may provide direct retail service. For example, a stadium or other venue may provide wireless communication services to visitors via a NH network. In this scenario, a UE (e.g., UE 102*a* or UE 102*b*) may elect to receive wireless communication services via the NH network by means of a high-level operating system (HLOS). The UE may identify itself to the NH network (e.g., without a subscriber identity module (SIM)) and enter into a service agreement with the NH network provider. The UE may then receive wireless communication services via the NH network in accordance with the terms of the service agreement.

In yet another example, a NH network (e.g., NH network 111) may provide residential service. For example, a NH AP installed in a home may provide wireless communication services to UEs (e.g., UE 102*a* or UE 102*b*) in the home. A UE may elect to receive wireless communication services via a HLOS. The homeowner may allow the UE access to the NH network (e.g., via a passcode).

As discussed previously, a NH network (e.g., NH network 111) may provide wireless communication services to multiple devices associated with one or more MNOs. Because NH networks and MNO networks may be separate networks that do not directly interact, handover from the NH network to the MNO network may be unsupported. Accordingly, the NH network may need to redirect a connected UE (e.g., UE 102*a* or UE 102*b*) to the UE's associated MNO network. Redirection may comprise releasing the UE from the NH network and providing sufficient information to the UE for the UE to reconnect to the MNO network. Thus, the NH network may need to acquire information about the UE's associated MNO network. Several techniques for acquiring information are described below.

In one aspect, redirection information may be provisioned in a UE and sent from the UE to the NH network. For example, UE 102*a* and macro AP 120*a* may be associated with a first MNO. UE 102*a* may be connected to NH AP 110 and receiving wireless communication services through a NH network 111. UE 102*a* may send a message to NH AP 110. The message may include MNO network information about the first MNO network. MNO network information may comprise a public land mobile network identifier (PLMN ID) of the first MNO network. In some configurations, the MNO network information may also comprise band information. The band information may comprise a band support table (BST) or bands based on location (Geo Bands). In one configuration, the MNO network information may be included in one or more new information elements (IE) in a UE capability information message as part of an Attach procedure.

After receiving the message with the MNO network information from UE 102*a*, the NH AP 110 may maintain a mapping between UE 102*a* and the MNO network information.

In another aspect, the NH network may extract MNO network information from handover information the NH network receives from the UE. For example, UE 102*a* may send NH AP 110 handover information regarding a network that the UE 102*a* previously visited. The NH AP 110 may extract MNO network information from the handover information. The NH AP 110 may further maintain a mapping between the extracted information and UE 102*a*.

In yet another aspect, the NH network may perform network listening to determine MNO network information. For example, NH AP 110 may listen for messages broadcast by one or more neighboring APs (e.g., macro AP 120*a* and macro AP 120*b*). The NH AP 110 may identify one or more of the one or more neighboring APs as macro APs based on whether a neighboring AP broadcasts a message that includes a physical cell identifier (PCI) that falls in a range of PCIs that the NH AP 110 knows are associated with macro APs. The NH AP 110 may then identify one or more bands used by the macro APs.

In still another aspect, the NH network may learn about neighboring networks from UE measurement reports. For example, NH AP 110 may receive a measurement report from UE 102*a*. NH AP 110 may determine information about one or more neighboring cells based on the measurement report. The determined information may include information about neighboring APs and band information associated with the neighboring APs.

In another aspect, the NH network may determine MNO network information from an operations and management (OAM) configuration file. For example, the first MNO may negotiate an offload service agreement with the operator of the NH network. The first MNO may then provide information about the MNO network, such as band information, to the NH network operator. In this manner, the NH AP 110 may be provisioned with an OAM configuration file that includes MNO network information for the first MNO network. The NH AP 110, for example, may then determine band information regarding one or more MNO networks from the OAM configuration file.

In yet another aspect, the NH network may combine information from multiple sources to determine the MNO network information. For example, NH AP 110 may receive information from UE 102*a* regarding one or more MNO networks. In some instances, this information may be received in the form of a UE capability information message, a measurement report, and/or some other message. Further, the NH AP 110 may determine additional information about the one or more MNO networks. In some instances, the NH AP 110 may perform network listening to determine whether neighboring APs are macro APs and to determine the bands on which the neighboring APs are operating (e.g., the bands on which the MNO network operates in this region). In other instances, the NH AP 110 may determine the additional information from an OAM configuration file. The NH AP 110 may combine information from one or more of these sources to determine the information needed to redirect the UE 102*a* to the first MNO network.

In another configuration, redirection may be performed based on a UE's configuration. For example, NH AP 110 may not have sufficient information to redirect UE 102*a* to the first MNO network. In one aspect, the NH AP 110 may send a redirection command to the UE 102*a* without any band information. The UE 102*a* may then determine a redirection band by itself. In another aspect, the UE 102*a* may send measurement reports without receiving a measurement configuration from the NH AP 110. Based on these measurement reports, the NH AP 110 may command the UE 102*a* to redirect to a particular MNO network based on signal quality information in the measurement reports without providing band information. In yet another aspect, the NH AP 110 may send a redirect command to the UE 102*a* that includes multiple potential bands from an OAM configuration file. The UE 102*a* may then determine a band based on one or more of the UE's configuration, a BST, Geo Bands, and/or signal-strength information.

As illustrated in FIG. 1, a NH AP 110 may support redirection to multiple MNO networks. For example, NH AP 110 may redirect UE 102*a* to macro AP 120*a* that is part of a first MNO and may redirect UE 102*b* to a macro AP 120*b* that is part of a second MNO. Different NH APs, such as NH AP 110, may support redirection to different sets of MNOs. For example, NH AP 110 may support redirection to a first MNO and a second MNO. In another example, NH AP 110 may support redirection to a third MNO and a fourth MNO.

Figure 2:
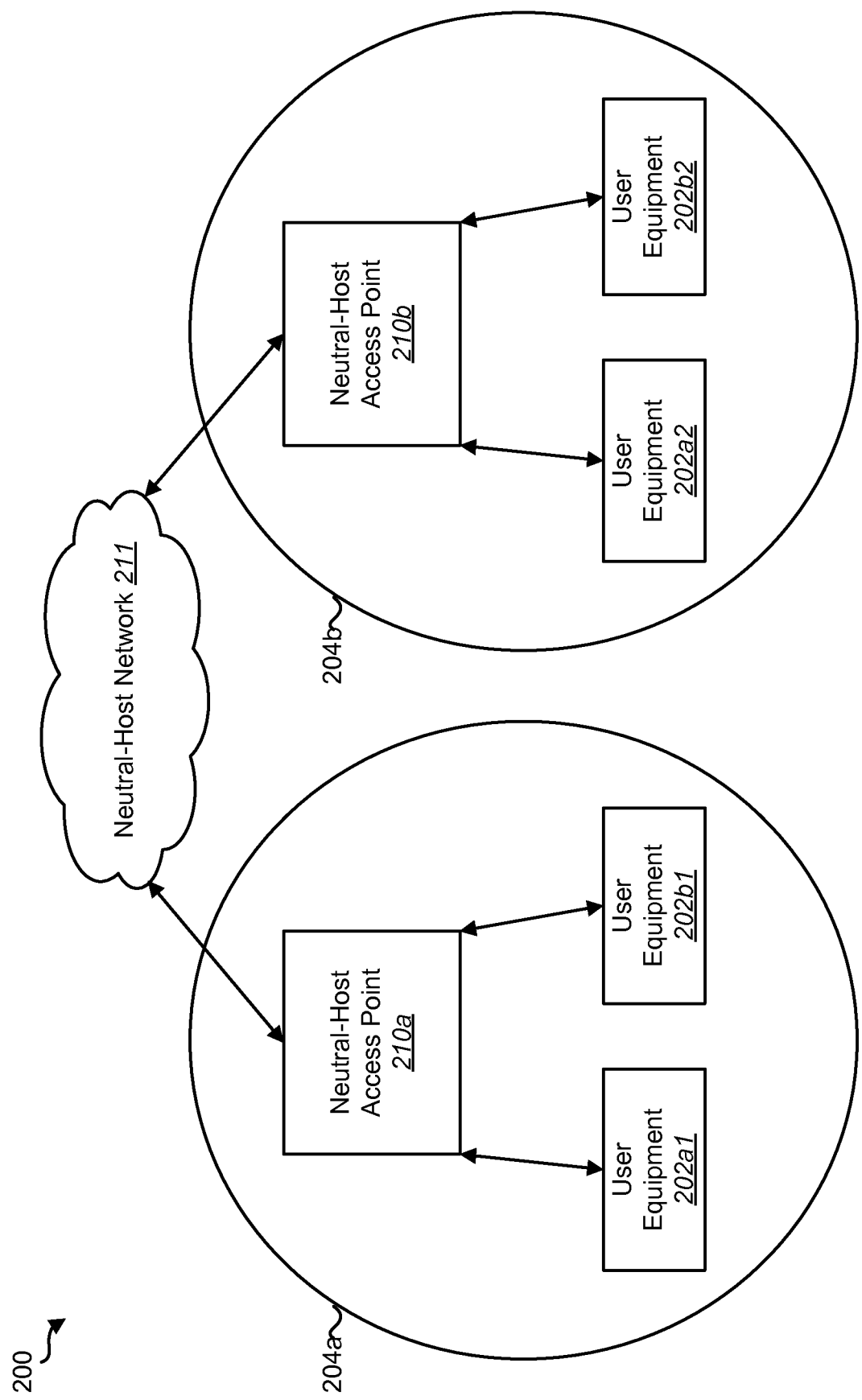
FIG. 2 illustrates another example of a wireless communication system.

FIG. 2 illustrates another example of a wireless communication system 200. The wireless communication system 200 may include NH APs 210*a* and 210*b* connected to NH network 211. NH AP 210*a* may be able to communicate with NH AP 210*b* via NH network 211, for example, via backhaul messaging. NH AP 210*a* may be in communication with UEs 202*a*1 and 202*b*1. NH AP 210*b* may be in communication with UEs 202*a*2 and 202*b*2.

In one configuration, the NH network 211 may support scenarios when the same channel is used for different MNOs in different regions. For example, the NH network 211 may support offload for a first MNO and a second MNO. UEs 202*a*1 and 202*b*1 may be associated with the first MNO. UEs 202*a*2 and 202*b*2 may be associated with the second MNO. In a first region 204*a*, the NH network 211 may include NH AP 210*a*. In the first region 204*a*, the first MNO may operate on a first channel and the second MNO may operate on a second channel. In a second region 204*b*, the NH network 211 may include NH AP 210*b*. In the second region, the first MNO may operate on a second channel and the second MNO may operate on the first channel. In the first region, the NH AP 210*a* may redirect UE 202*a*1 to the first MNO on the first channel. NH AP 210*a* may also redirect UE 202*b*1 to the second MNO on the second channel. In the second region, NH AP 210*b* may redirect UE 202*a*2 to the first MNO on the second channel. NH AP 210*b* may also redirect UE 202*b*2 to the second MNO on the first channel.

Figure 3:
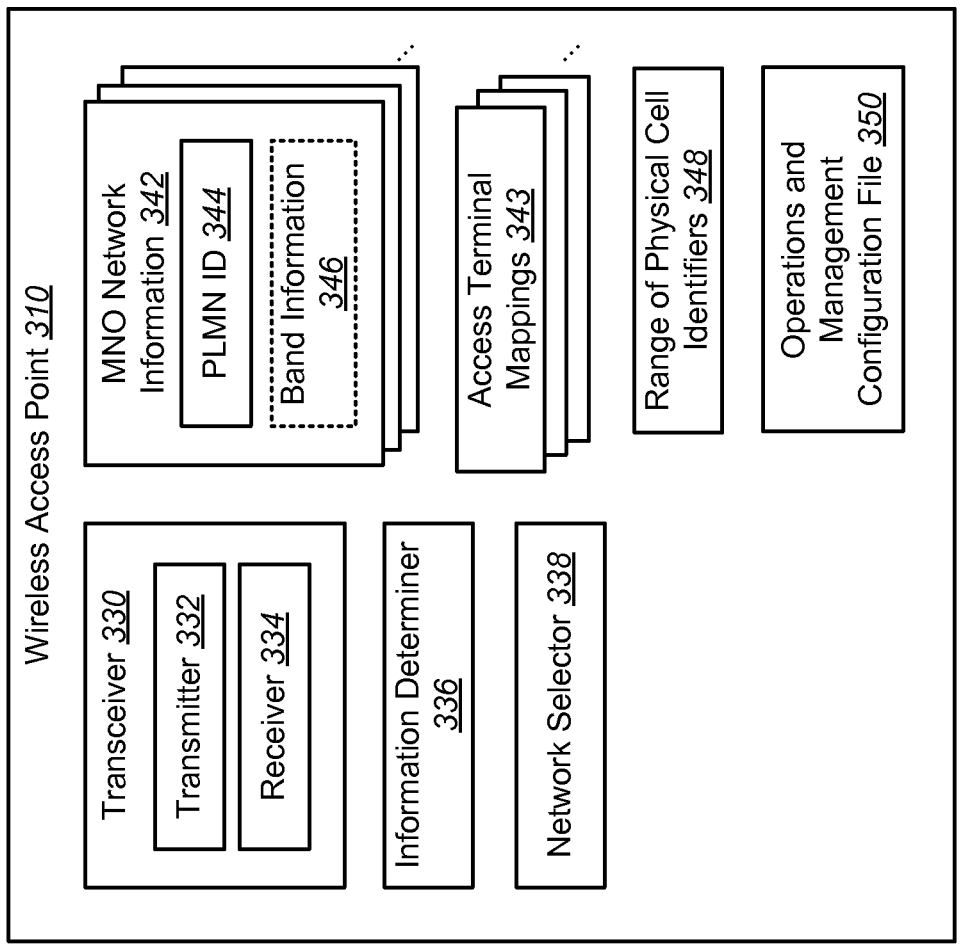
FIG. 3 is a block diagram illustrating one example of a wireless access point.

FIG. 3 is a block diagram illustrating one example of a wireless access point 310. Wireless AP 310 may correspond to, for example, NH APs 110, 210*a*, and 210*b*. The wireless AP 310 may include a transceiver 330, an information determiner 336, and a network selector 338. The wireless AP 310 may also include MNO network information 342 for one or more MNO networks, access terminal mappings 343 for one or more UEs, a range of physical cell identifiers (PCIs) 348, and an operations and management (OAM) configuration file 350.

The transceiver 330 may include a transmitter 332 and a receiver 334. The transmitter 332 may enable the wireless AP 310 to transmit messages in a wireless communication system, such as wireless communication systems 100 and 200. The receiver 334 may enable the wireless AP 310 to receive messages in wireless communication systems 100 and 200.

The information determiner 336 may enable the wireless AP 310 to determine MNO network information 342 for a UE about one or more MNO networks. The information determiner 336 may enable the wireless AP 310 to determine the MNO network information 342 for the UE, for example, by performing the functions described in any of FIGS. 6-12.

In one example, the information determiner 336 may cooperate with the transceiver 330 to receive a message from the UE. The information determiner 336 may determine a PLMN ID 344 and, optionally, band information 346 for a MNO network based on a PLMN ID 344 and, optionally, band information 346 that is included in the message. The information determiner 336 may also generate and/or maintain one or more access terminal mappings 343 that map the MNO network information 342 to the UE that transmitted the message.

In another example, the information determiner 336 may cooperate with the transceiver 330 to receive handover information regarding a network that the UE previously visited. The information determiner 336 may extract MNO network information 342 from the handover information and generate and/or maintain an access terminal mapping 343 between the UE and the extracted MNO network information 342.

In yet another example, the information determiner 336 may cooperate with the transceiver 330 to listen for messages broadcast by one or more neighboring APs. The information determiner may identify one or more macro APs from among the one or more neighboring APs based on whether a neighboring AP broadcasts a message that includes a PCI that is within the range of PCIs 348.

In still another example, the information determiner 336 may cooperate with the transceiver 330 to receive a measurement report from the UE. The information determiner 336 may determine information about one or more neighboring cells based on the measurement report. The information determiner may use this information to derive MNO network information 342 such as band information 346.

In another example, the information determiner 336 may utilize the OAM configuration file 350 to determine band information 346 regarding the one or more MNO networks. The wireless AP 310 may be provisioned with the OAM configuration file 350. The OAM configuration file 350 may include information relating to an offload agreement between the NH network operator and an MNO. For example, the OAM configuration file 350 may include band information 346 for all of the bands in which the MNO network operates.

The network selector 338 may enable the wireless AP 310 to select an MNO network for redirection based on the MNO network information 342 and access terminal mappings 343 generated and/or maintained by the information determiner 336. The wireless AP 310 may transmit via transceiver 330 a redirection message to the UE that instructs the UE to redirect to the MNO network selected by network selector 338.

As mentioned previously, the MNO network information 342 may comprise a PLMN ID 344 and, optionally, band information 346. The band information 346 may be region specific. For example, a first wireless AP 210a may maintain band information 346 for an MNO network in first region 204a that is different from band information 346 maintained by a second wireless AP 210b in a second region 204b. This may enable the wireless AP 310 to redirect UEs in the first region to an associated MNO network on a first channel and UEs in the second region to the associated MNO network on a second channel.

Figure 4:
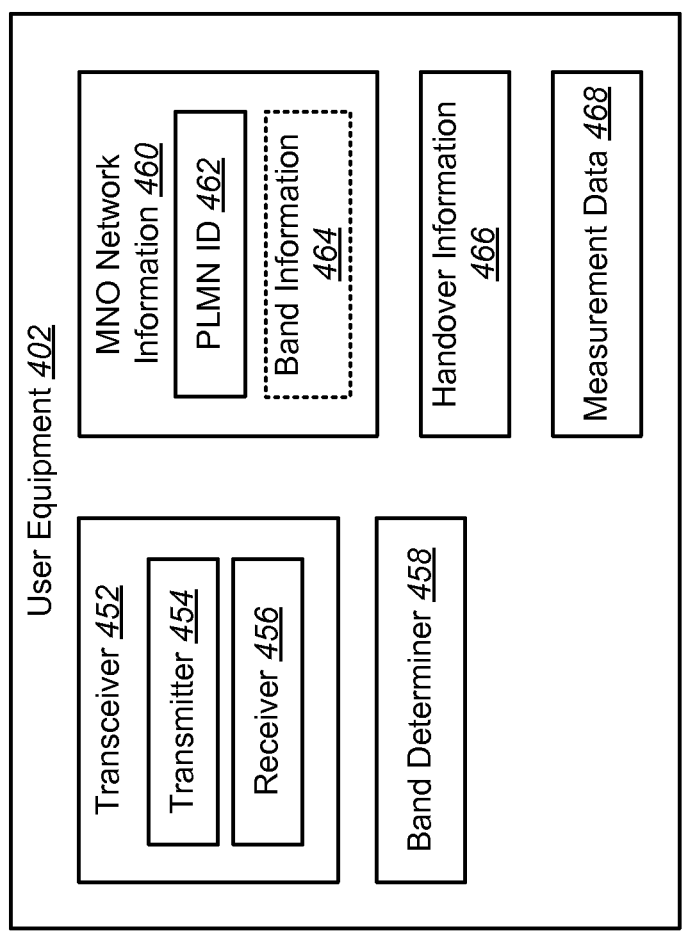
FIG. 4 is a block diagram illustrating one example of a user equipment.

FIG. 4 is a block diagram illustrating one example of a user equipment (UE) 402. UE 402 may correspond to, for example, UEs 102a, 102b, 202a1, 202a2, 202b1, and 202b2. UE 402 may include a transceiver 452, a band determiner 458, MNO network information 460, handover information 466, and measurement data 468.

The transceiver 452 may include a transmitter 454 and a receiver 456. The transmitter 454 may enable the UE 402 to transmit messages in wireless communication systems 100 and 200. The receiver 456 may enable the UE 402 to receive messages in wireless communication systems 100 and 200.

In one configuration, the UE 402 may use transceiver 452 to transmit MNO network information 460 to a wireless AP 310. In one example, the UE 402 may be provisioned with the public land mobile network identifier (PLMN ID) 462 of a mobile network operator (MNO) network with which the UE 402 is associated. The UE 402 may also be provisioned with band information 464 for the MNO network. The UE 402 may transmit the MNO network information 460 to a wireless AP 310 in a message. The message may comprise a UE capability information message that is sent as part of an Attach procedure.

In another configuration, the UE 402 may use transceiver 452 to transmit handover information 466 to a wireless AP 310. The handover information 466 may include information regarding one or more networks that the UE 402 previously visited. The wireless AP 310 may use this information about a previously visited network to determine MNO network information 342 about the MNO network with which the UE 402 is associated.

In still another configuration, the UE 402 may use transceiver 452 to transmit measurement data 468 in the form of one or more measurement reports to a wireless AP 310. The measurement data 468 may comprise signal strength information regarding one or more neighboring cells from which the UE 402 is able to receive signals. The wireless AP 310 may use the measurement data 468 to determine information about the one or more neighboring cells.

In one configuration, the UE 402 may receive a redirection message from a wireless AP 310 via transceiver 452. The redirection message may direct the UE 402 to redirect to an MNO network and include MNO network information 460 to aid the UE 402 in connecting to the MNO network. For example, the redirection message may include a PLMN ID 462 and/or band information 464.

In another configuration, the UE 402 may receive via transceiver 452 a redirection message from a wireless AP 310 that does not include band information 464. The band determiner 458 may enable the UE 402 to determine band information 464 for the MNO network with which the UE 402 is associated. In one example, the band determiner 458 may determine band information 464 based on one or more of the UE's configuration, a band support table (BST), the UE's location (i.e., Geo Bands), and detected signal-strength information.

Figure 5:
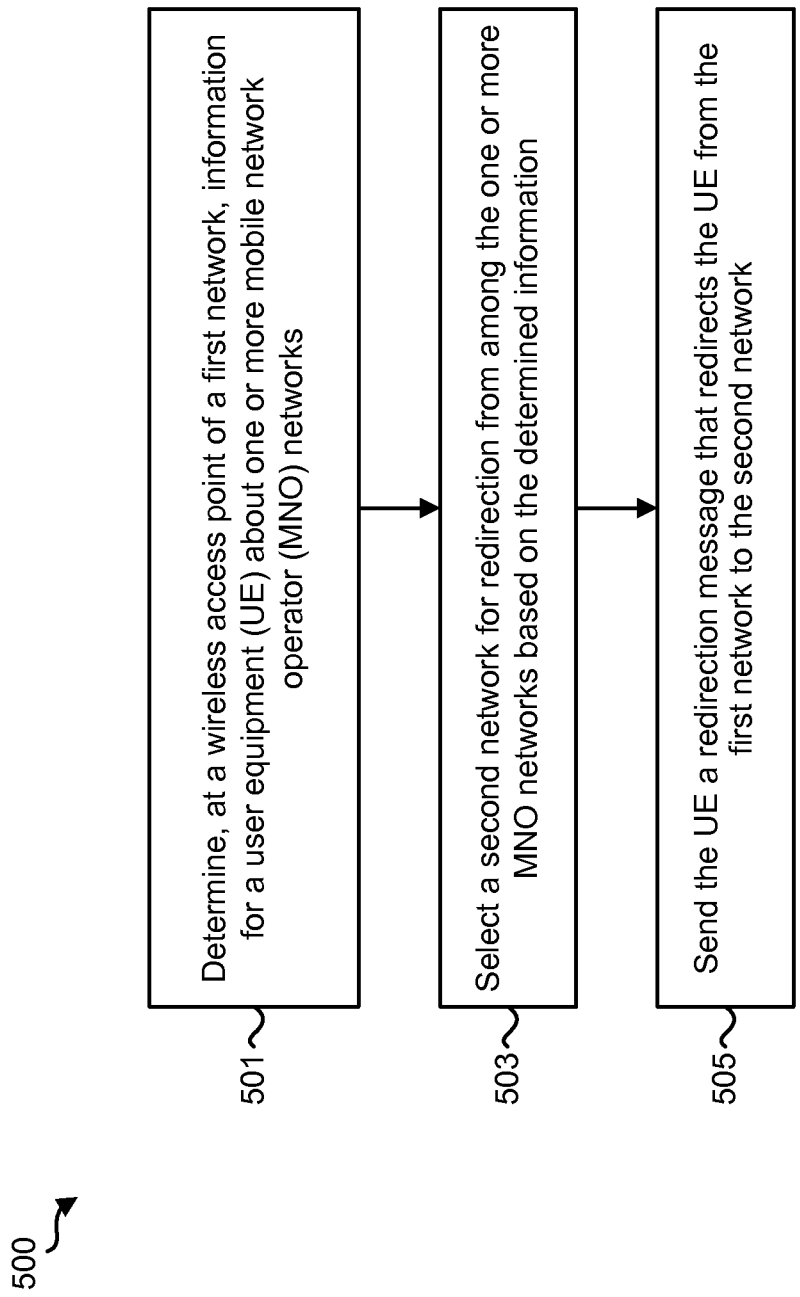
FIG. 5 is a flow diagram illustrating one example of a method for redirecting a user equipment from a first network to a second network.

FIG. 5 is a flow diagram illustrating one example of a method for redirecting a user equipment (UE) from a first network to a second network. The method may be performed by a wireless access point (AP) 310, such as neutral-host (NH) APs 110, 210a, and 210b. The UE may be a UE 402, such as UEs 102a, 102b, 202a1, 202b1, 202a2, and 202b2.

The wireless AP 310 may determine, at 501, information for the UE 402 about one or more mobile network operator (MNO) networks. The wireless AP 310 may determine the information for the UE 402 using an information determiner 336. The wireless AP 310 may determine the information for the UE 402 according to one or more of the methods, alone or in combination, described in FIGS. 6-12 below.

The wireless AP 310 may select, at 503, a second network for redirection from among the one or more MNO networks based on the determined information. The wireless AP 310 may select the second network for redirection using a network selector 338. In one configuration, selecting the second network may comprise selecting the second network based on a public land mobile network identifier (PLMN ID) 344 for the second network determined by the wireless AP 310. In another configuration, selecting the second network may comprise determining that the UE 402 is associated with the second network based on the determined information. In other words, wireless AP 310 may select the second network based upon a determination that UE 402 is associated with an MNO that operates the second network.

The wireless AP 310 may send, at 505, the UE 402 a redirection message that redirects the UE from the first network to the second network. The wireless AP 310 may send the UE 402 the redirection message using a transceiver 330. In an aspect, the wireless AP 310 may support redirection to more than one of the one or more MNO networks. In this scenario, the wireless AP 310 may be capable of redirecting each UE 402 served by the wireless access point to a different MNO network. In other words, the wireless AP 310 may be able to redirect each UE 402 to the MNO network with which that UE 402 is associated.

Figure 6:
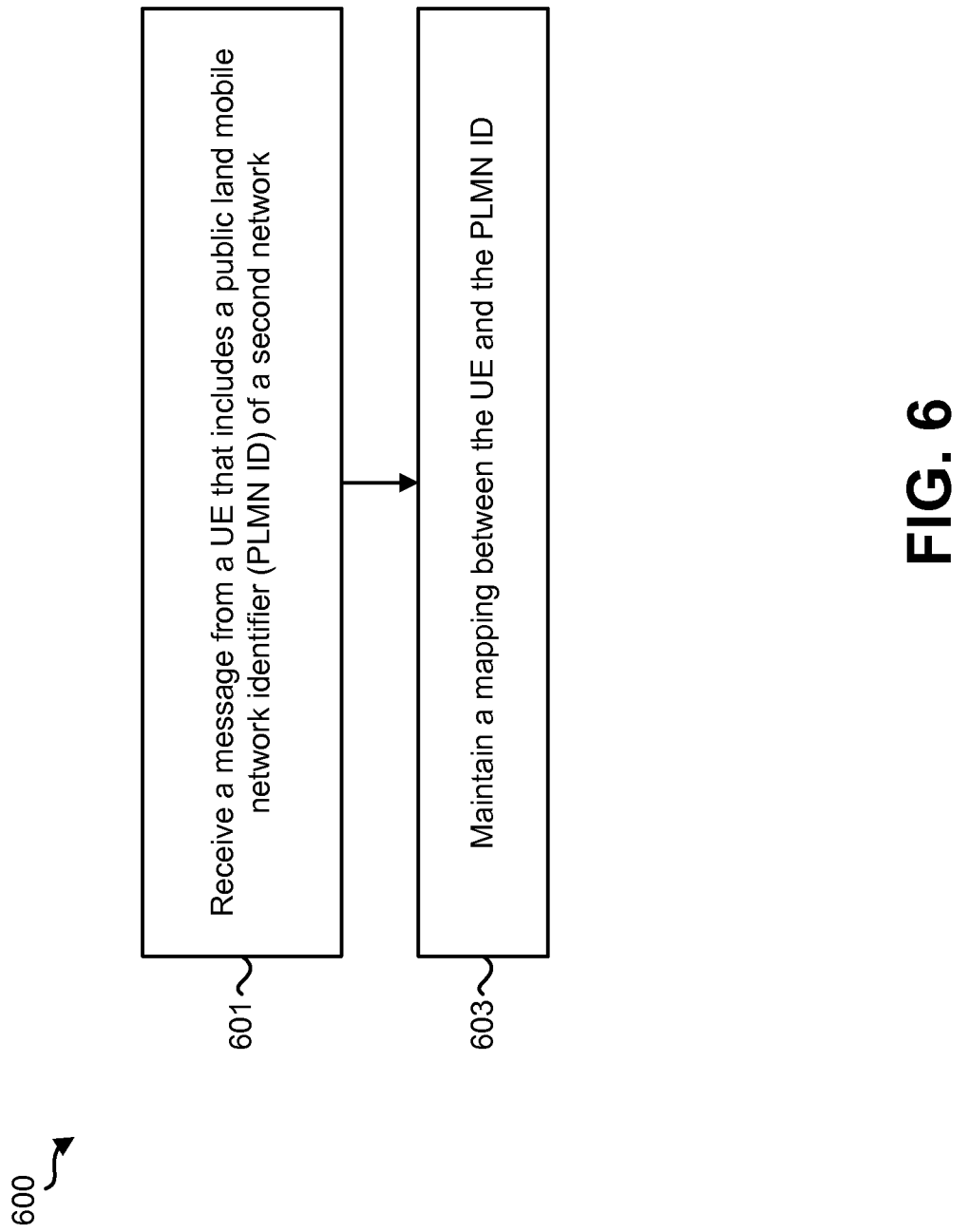
FIG. 6 is a flow diagram illustrating one example of a method for determining information about one or more mobile network operator networks.

FIG. 6 is a flow diagram illustrating one example of a method for determining information about one or more mobile network operator networks. The method may be performed by a wireless access point (AP) 310, such as neutral-host (NH) APs 110, 210*a*, and 210*b*. The wireless AP 310 may include an information determiner 336 that performs the functions described in FIG. 6 in cooperation with one or more other components, such as a transceiver 330. The user equipment (UE) may be a UE 402, such as UEs 102*a*, 102*b*, 202*a*1, 202*b*1, 202*a*2, and 202*b*2.

The wireless AP 310 may receive, at 601, a message from a UE 402 that includes a public land mobile network identifier (PLMN ID) 462 of a second network. The message may also include band information 464 for the second network. The wireless AP 310 may maintain, at 603, a mapping 343 between the UE 402 and the PLMN ID 344 and, optionally, the band information 346.

In one configuration, the message may be a UE capability information message that is sent as part of an Attach procedure. This may occur, for example, when the UE 402 registers with the wireless AP 310. In this scenario, the PLMN ID 462 and band information 464 may be included in one or more new information elements (IEs). The one or more new IEs may be defined in a manner similar to existing IEs in a UE capability information message.

The information in the message may be stored by both the wireless AP 310 as well as another entity in the neutral-host network 111, such as a mobility management entity (MME). In some circumstances, such as when UE 402 switches from connected mode to idle mode, the wireless AP 310 may release the information while the MME retains the information. If this occurs, the MME may send the information to the wireless AP 310 as part of the context setup process if the UE 402 attempts to reconnect to the wireless AP 310.

In another configuration, the message may be a UE capability information message that is sent from UE 402 in response to a UE capability enquiry message sent from the wireless AP 310. This may occur, for example, when the UE 402 attempts to reconnect to the wireless AP 310. The PLMN ID 462 and band information 464 may be included in one or more new IEs. The one or more new IEs may be defined in a manner similar to existing IEs in a UE capability information message.

Figure 7:
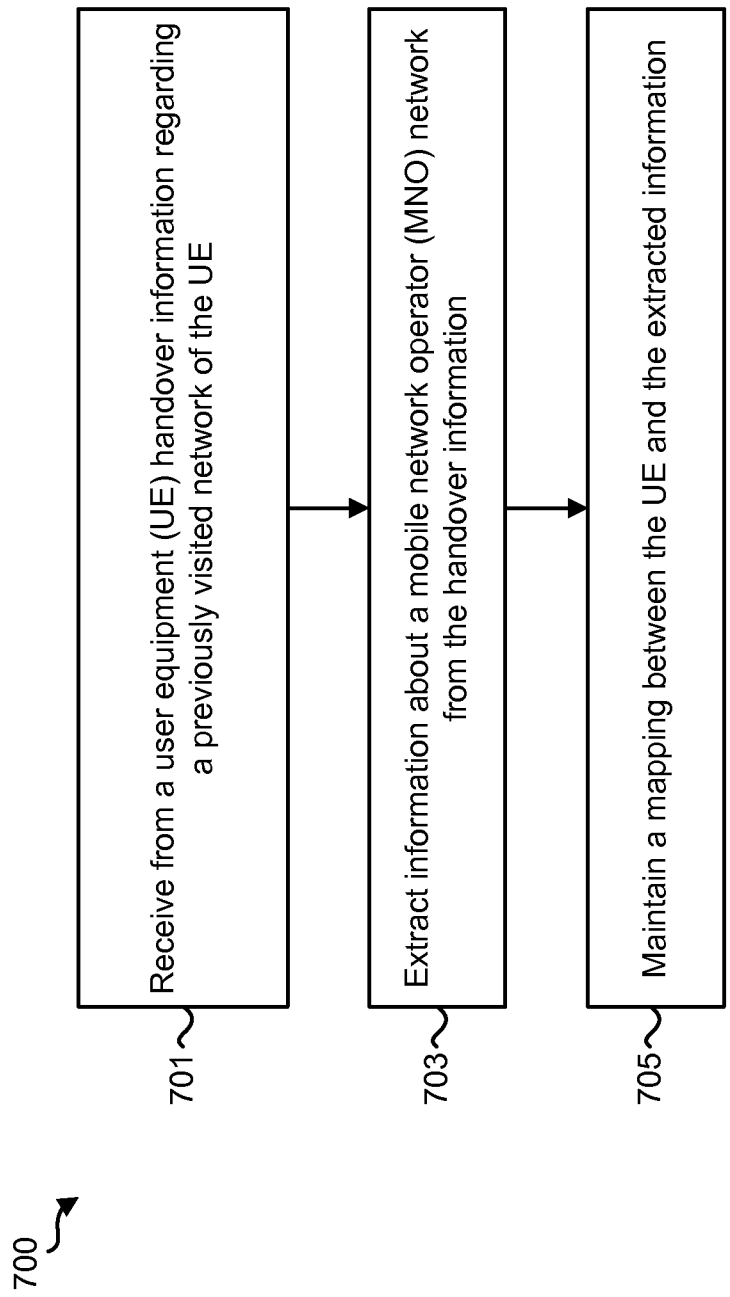
FIG. 7 is a flow diagram illustrating one example of a method for determining information about one or more mobile network operator networks.

FIG. 7 is a flow diagram illustrating one example of a method for determining information about one or more mobile network operator networks. The method may be performed by a wireless access point (AP) 310, such as neutral-host (NH) APs 110, 210*a*, and 210*b*. The wireless AP 310 may include an information determiner 336 that performs the functions described in FIG. 7 in cooperation with one or more other components, such as a transceiver 330. The user equipment (UE) may be a UE 402, such as UEs 102*a*, 102*b*, 202*a*1, 202*b*1, 202*a*2, and 202*b*2.

The wireless AP 310 may receive, at 701, from a UE 402 handover information 466. The handover information 466 may include information about a network that the UE 402 previously visited. In one example, the handover information 466 may be included in a Handover Confirm message sent from the UE 402 to the wireless AP 310. The wireless AP 310 may extract, at 703, information about a mobile network operator (MNO) network from the handover information 466. The extracted information may comprise MNO network information 342. The wireless AP 310 may maintain, at 705, a mapping 343 between the UE 402 and the extracted information.

Figure 8:
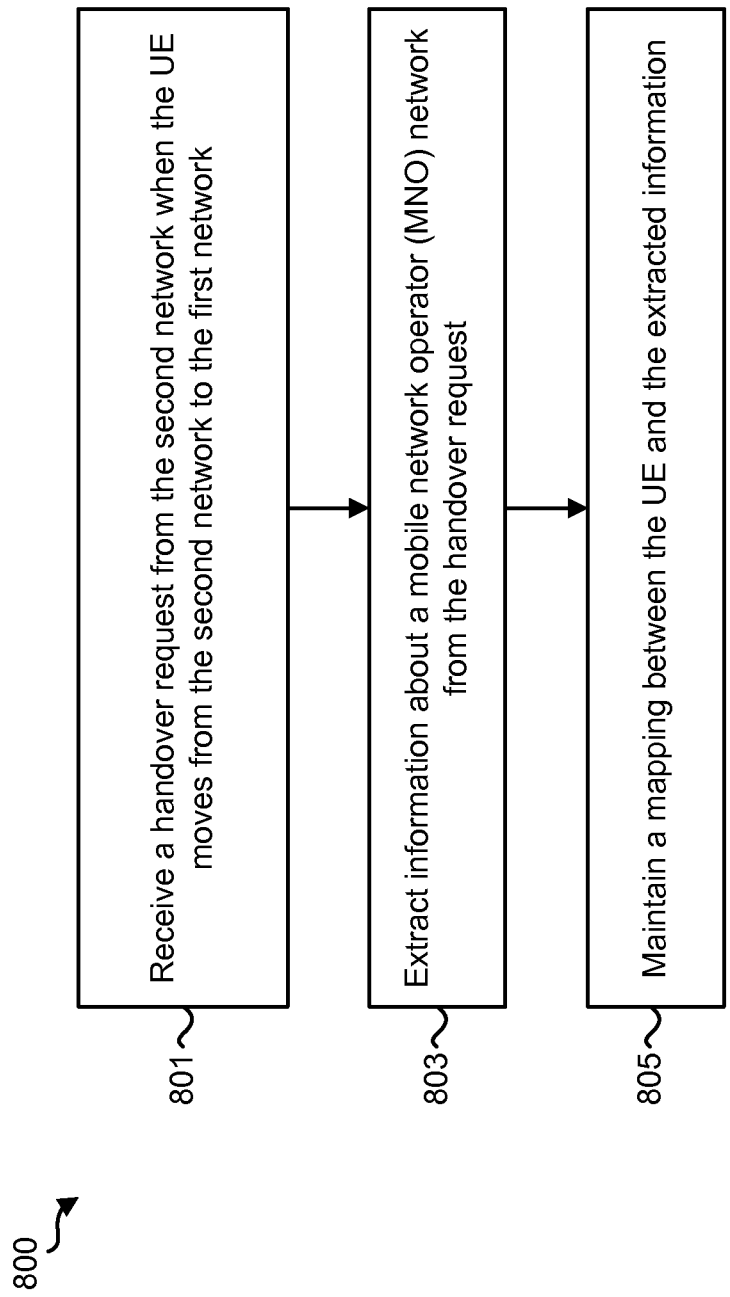
FIG. 8 is a flow diagram illustrating one example of method for determining information about one or more mobile network operator networks.

FIG. 8 is a flow diagram illustrating one example of a method for determining information about one or more mobile network operator networks. The method may be performed by a wireless access point (AP) 310, such as neutral-host (NH) APs 110, 210*a*, and 210*b*. The wireless AP 310 may include an information determiner 336 that performs the functions described in FIG. 8 in cooperation with one or more other components, such as a transceiver 330. The second wireless AP may be a NH AP, such as NH APs 110, 210*a*, and 210*b*. The user equipment (UE) may be a UE 402, such as UEs 102*a*, 102*b*, 202*a*1, 202*b*1, 202*a*2, and 202*b*2.

The wireless AP 310 may receive, at 801, a handover request from the second network when the UE moves from the second network to the first network. The wireless AP 310 may extract, at 803, information about a mobile network operator (MNO) network from the handover request. The wireless AP 310 may maintain, at 805, a mapping 343 between a UE 402 and the extracted information.

Figure 9:
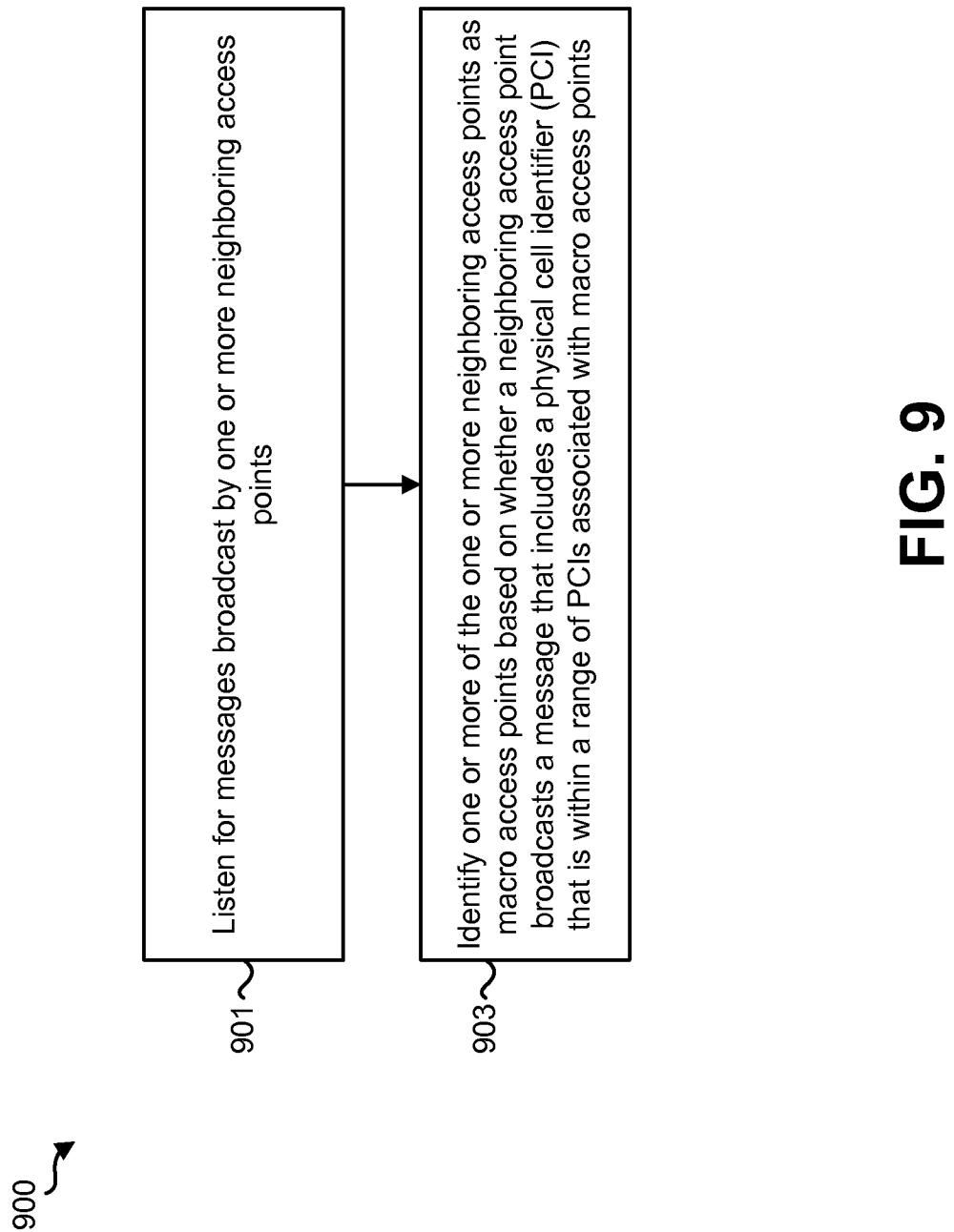
FIG. 9 is a flow diagram illustrating one example of method for determining information about one or more mobile network operator networks.

FIG. 9 is a flow diagram illustrating one example of method for determining information about one or more mobile network operator networks. The method may be performed by a wireless access point (AP) 310, such as neutral-host (NH) APs 110, 210*a*, and 210*b*. The wireless AP 310 may include an information determiner 336 that performs the functions described in FIG. 9 in cooperation with one or more other components, such as a transceiver 330. The user equipment (UE) may be a UE 402, such as UEs 102*a*, 102*b*, 202*a*1, 202*b*1, 202*a*2, and 202*b*2.

The wireless AP 310 may listen, at 901, for messages broadcast by one or more neighboring APs. The wireless AP 310 may identify, at 903, one or more of the one or more neighboring APs as macro APs (e.g., macro APs 120*a*, 120*b*) based on whether a neighboring AP broadcasts a message that includes a physical cell identifier (PCI) that is within a range of PCIs 348 associated with macro APs. For example, the one or more neighboring APs may broadcast a PCI in a System Information Block (SIB) 1. In another example, the range of PCIs 348 may follow an approach similar to the csg_PhysCellIdRange field in an SIB4.

Figure 10:
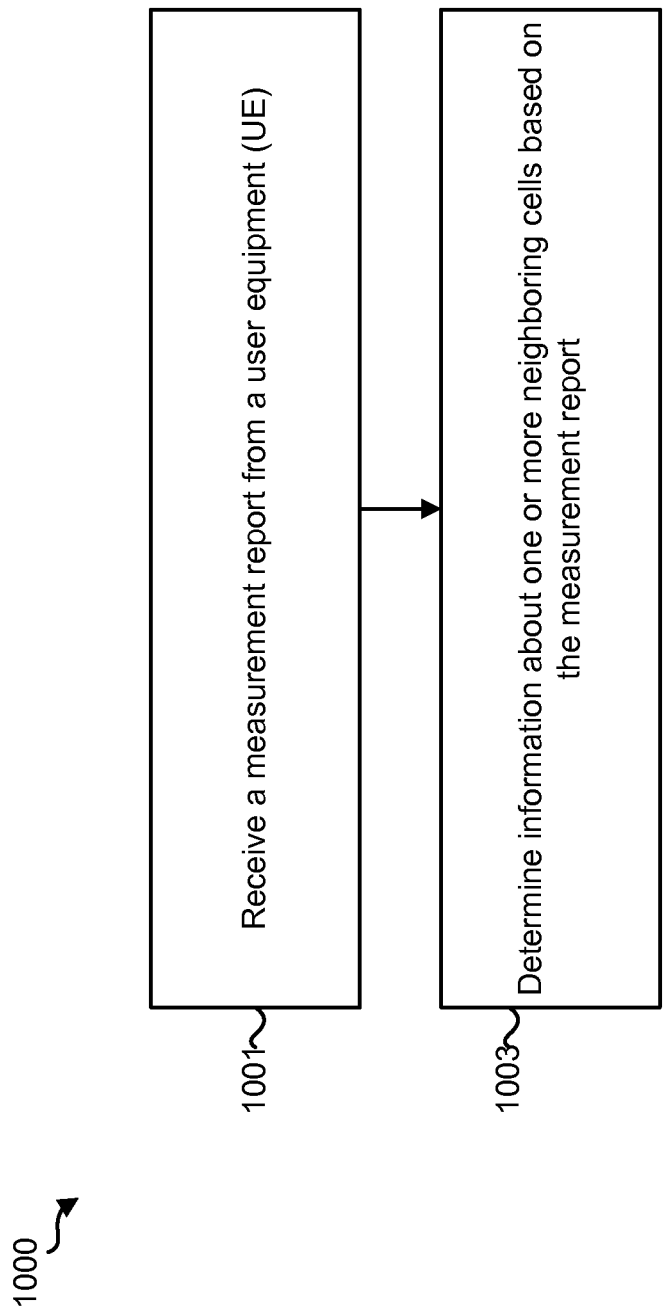
FIG. 10 is a flow diagram illustrating one example of method for determining information about one or more mobile network operator networks.

FIG. 10 is a flow diagram illustrating one example of method for determining information about one or more mobile network operator networks. The method may be performed by a wireless access point (AP) 310, such as neutral-host (NH) APs 110, 210*a*, and 210*b*. The wireless AP 310 may include an information determiner 336 that performs the functions described in FIG. 10 in cooperation with one or more other components, such as a transceiver 330. The user equipment (UE) may be a UE 402, such as UEs 102a, 102b, 202a1, 202b1, 202a2, and 202b2.

The wireless AP 310 may receive, at 1001, a measurement report from a UE 402. The UE 402 may generate the measurement report based on measurement data 468. In one configuration, the measurement report may be a Radio Resource Control (RRC) message.

The wireless AP 310 may determine, at 1003, information about one or more neighboring cells based on the measurement report. For example, the wireless AP 310 may determine band information 346 from the measurement report.

In yet another configuration, the UE 402 may send the measurement report to the wireless AP 310 periodically. For example, the measurement report may be sent as part of a Minimization of Drive Tests (MDT) procedure.

Figure 11:
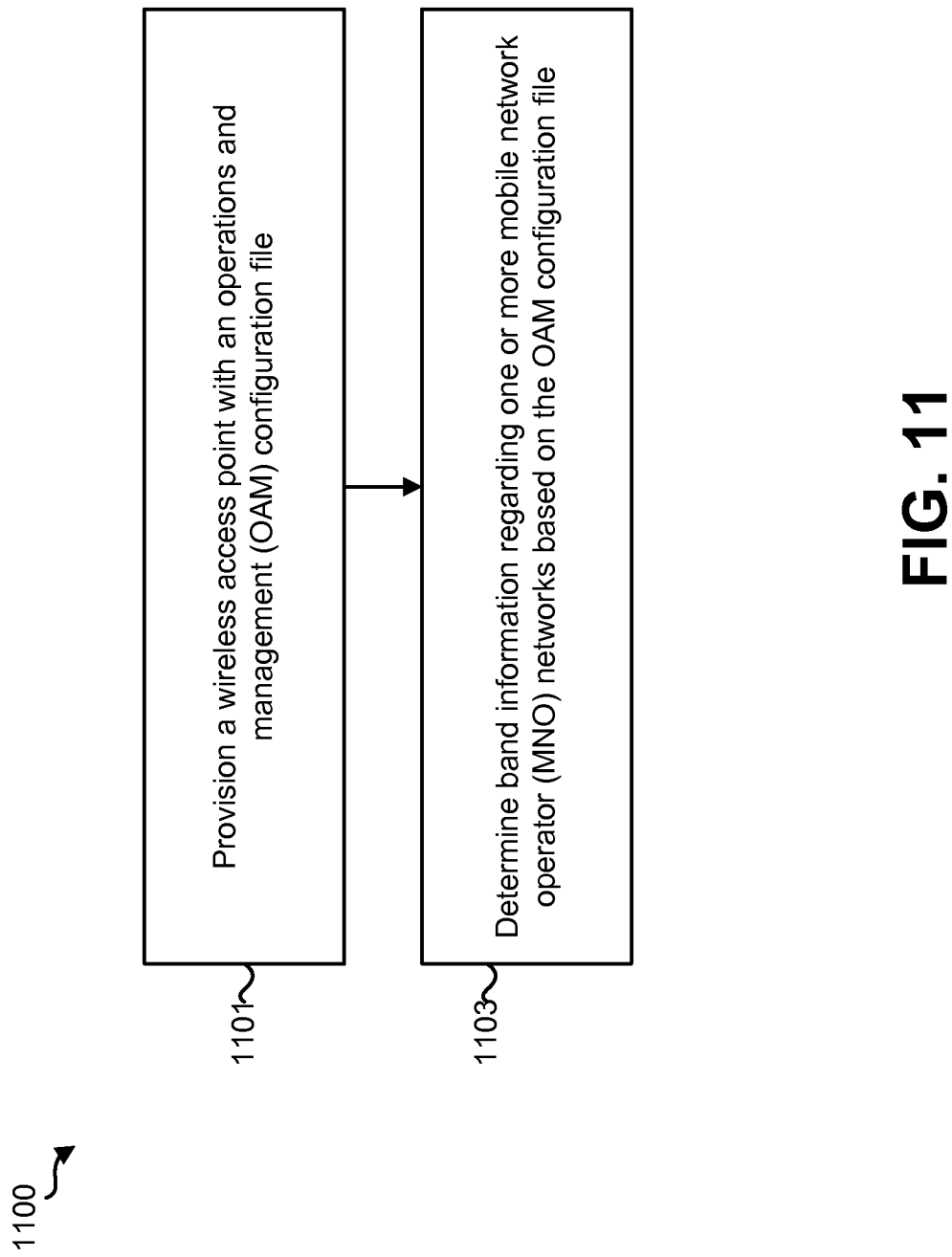
FIG. 11 is a flow diagram illustrating one example of method for determining information about one or more mobile network operator networks.

FIG. 11 is a flow diagram illustrating one example of method for determining information about one or more mobile network operator networks. The method may be performed by a wireless access point (AP) 310, such as neutral-host (NH) APs 110, 210a, and 210b. The wireless AP 310 may include an information determiner 336 that performs the functions described in FIG. 11 in cooperation with one or more other components, such as a transceiver 330. The user equipment (UE) may be a UE 402, such as UEs 102a, 102b, 202a1, 202b1, 202a2, and 202b2.

The wireless AP 310 may be provisioned, at 1101, with an operations and management (OAM) configuration file 350. The wireless AP 310 may determine, at 1103, band information 346 regarding one or more mobile network operator (MNO) networks based on the OAM configuration file 350. For example, the wireless AP 310 may determine band information 346 regarding a partner MNO network from the OAM configuration file 350. In another example, a Technical Report 069 (TR-069) interface may be used for an eNB OAM interface.

Figure 12:
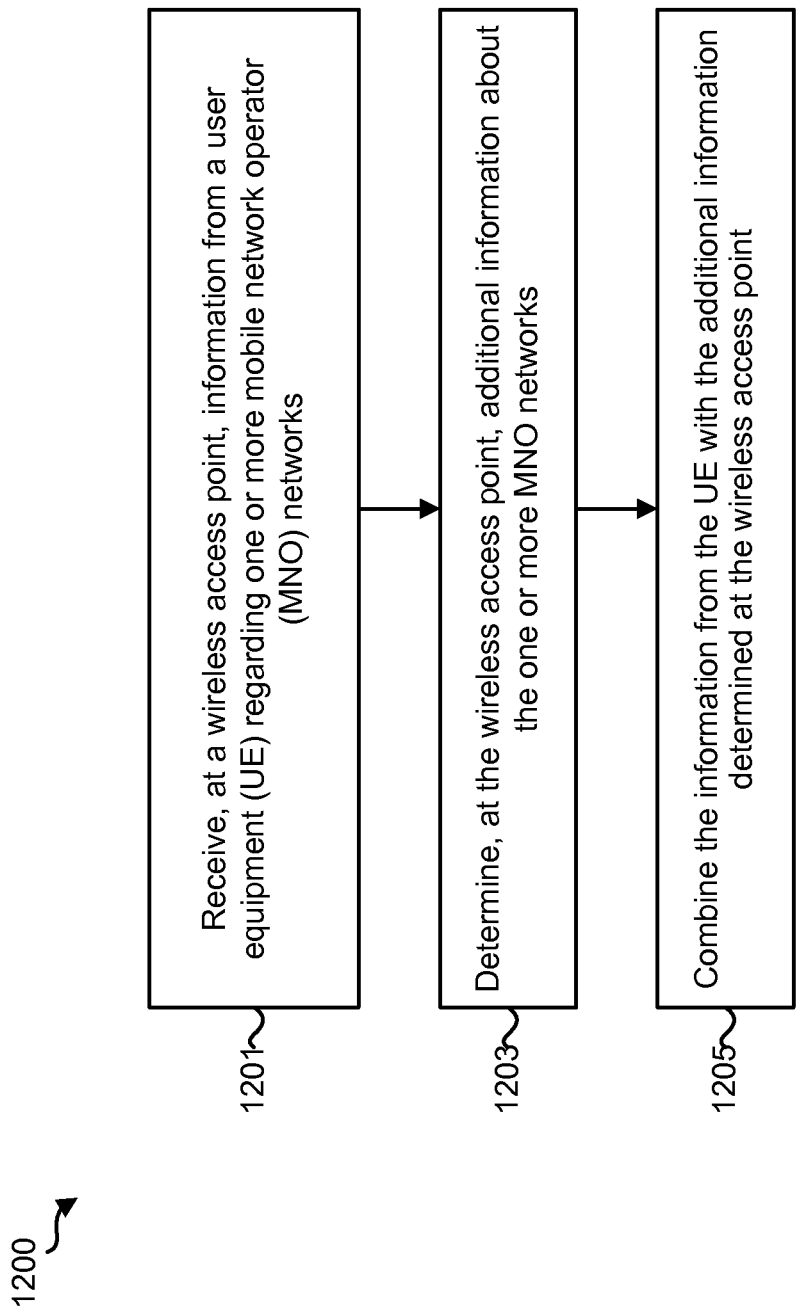
FIG. 12 is a flow diagram illustrating one example of method for determining information about one or more mobile network operator networks.

FIG. 12 is a flow diagram illustrating one example of method for determining information about one or more mobile network operator networks. The method may be performed by a wireless access point (AP) 310, such as neutral-host (NH) APs 110, 210a, and 210b. The wireless AP 310 may include an information determiner 336 that performs the functions described in FIG. 12 in cooperation with one or more other components, such as a transceiver 330. The user equipment (UE) may be a UE 402, such as UEs 102a, 102b, 202a1, 202b1, 202a2, and 202b2.

The wireless AP 310 may receive, at 1201, information from a UE 402 regarding one or more mobile network operator (MNO) networks. For example, the wireless AP 310 may receive from the UE 402 MNO network information 460, handover information 466, measurement data 468, or combinations thereof.

The wireless AP 310 may determine, at 1203, additional information about the one or more MNO networks. For example, the wireless AP 310 may extract information from the handover information 466, identify macro APs from among one or more neighboring APs, and/or determine information about the one or more neighboring APs based on the measurement report.

The wireless AP 310 may combine, at 1205, the information from the UE 402 with the additional information. The wireless AP 310 may use this combined information to generate a redirection message for the UE 402. In one example, the redirection message may be an RRC connection release message.

Figure 13:
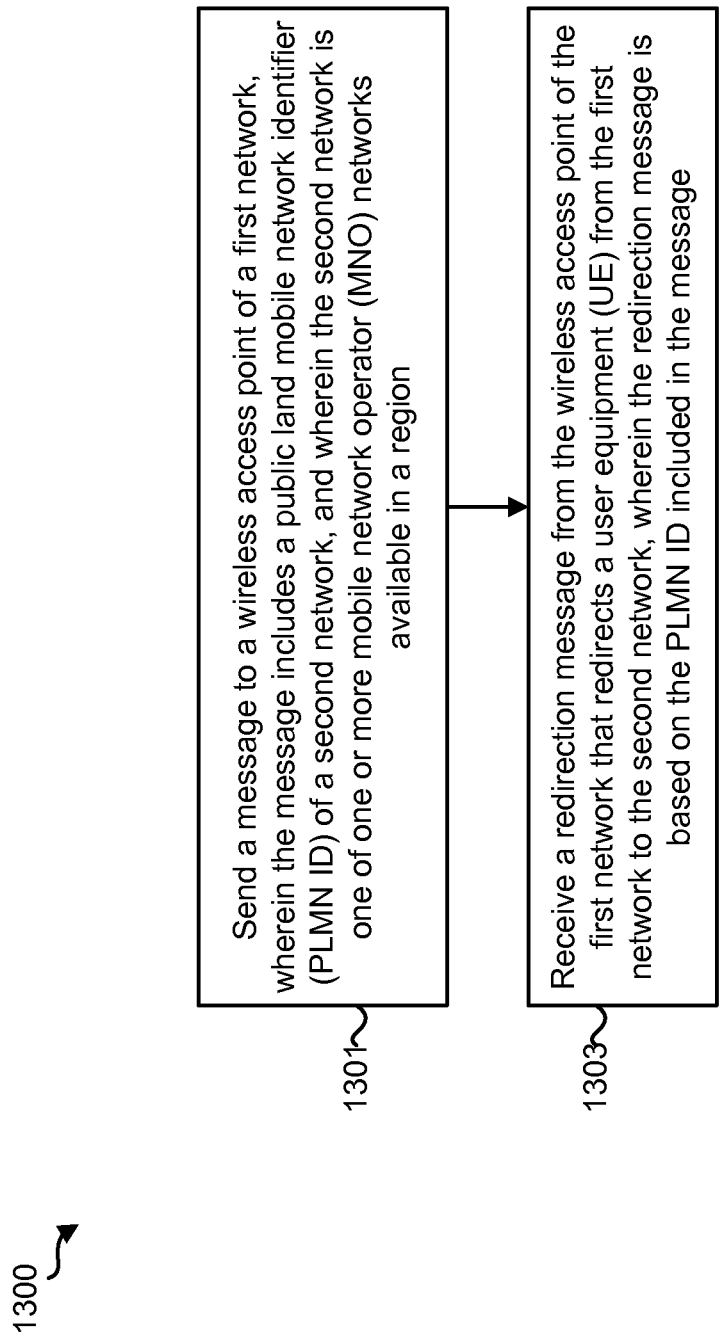
FIG. 13 is a flow diagram illustrating another example of a method for redirecting a user equipment from a first network to a second network.

FIG. 13 is a flow diagram illustrating another example of a method for redirecting a user equipment (UE) from a first network to a second network. The method may be performed by a UE 402, such as UEs 102a, 102b, 202a1, 202b1, 202a2, and 202b2. The wireless access point (AP) may be a wireless AP 310, such as neutral-host (NH) APs 110, 210a, and 210b.

The UE 402 may send, at 1301, a message to a wireless AP 310 of a first network. The UE 402 may send the message using a transceiver 452. The message may include a public land mobile network identifier (PLMN ID) 462 of a second network. The second network may be one of one or more mobile network operator (MNO) networks that are available in a region.

The message may also include band information 464 of the second network. In one configuration, the message may comprise a UE capability information message that is sent as part of an Attach procedure. The PLMN ID 462 and/or the band information 464 may be included in one or more new or existing information elements (IEs) in the UE capability information message. The first network may be a neutral-host (NH) network.

In some configurations, the UE 402 may additionally send handover information 466 to the wireless AP 310. The UE 402 may send the handover information using the transceiver 452. The handover information 466 may comprise information regarding a previously visited network of the UE 402.

In other configurations, the UE 402 may additionally send a measurement report to the wireless AP 310. The UE 402 may send the measurement report using the transceiver 452. The UE 402 may generate the measurement report based on measurement data 468 that the UE 402 collects.

The UE 402 may receive, at 1303, a redirection message from the wireless AP 310 of the first network that redirects the UE 402 from the first network to the second network. The UE 402 may receive the redirection message using transceiver 452. The redirection message may be based on the PLMN ID 462 included in the message sent by the UE 402. The redirection message may also or may alternatively be based on the band information 464 included in the message sent by the UE 402.

In configurations where the UE 402 has sent handover information 466 and/or a measurement report to the wireless AP 310, the redirection message may further be based on the handover information 466 and/or the measurement report.

Figure 14:
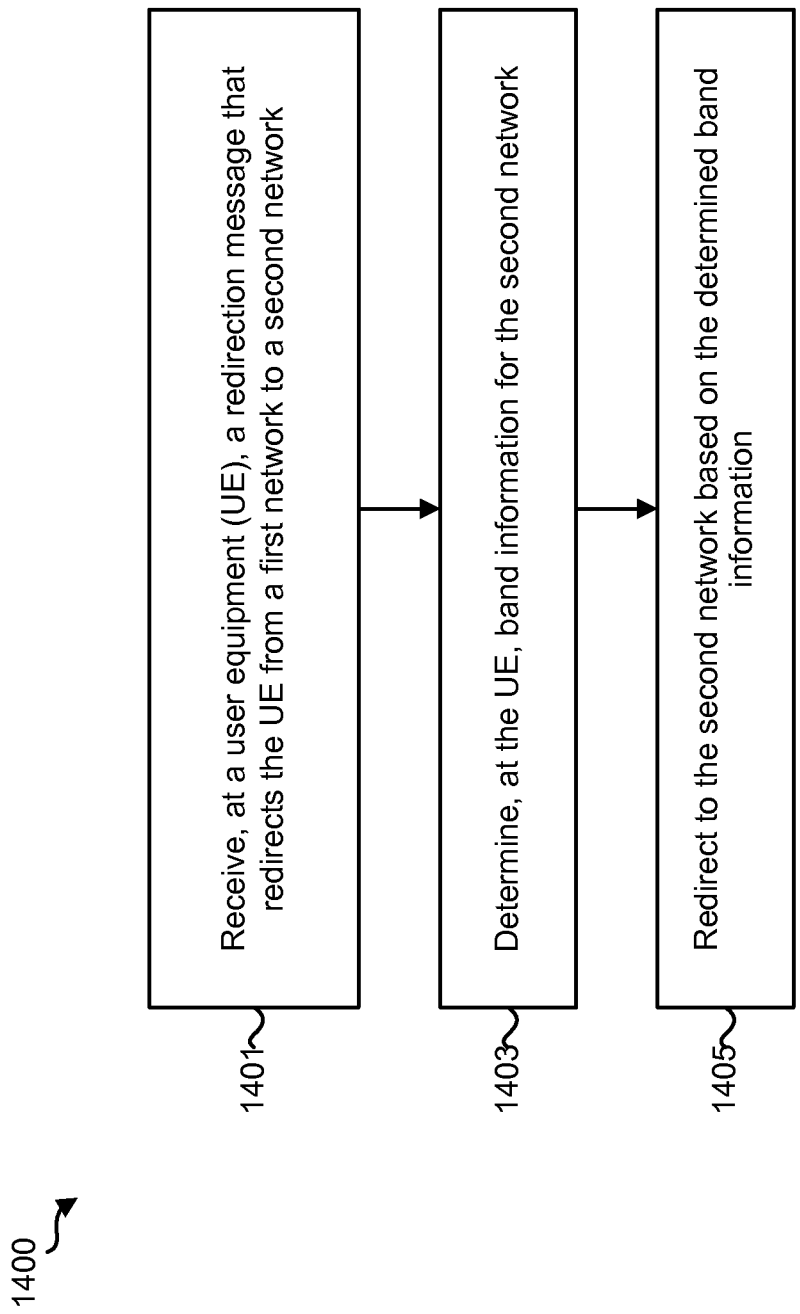
FIG. 14 is a flow diagram illustrating yet another example of a method for redirecting a user equipment from a first network to a second network.

FIG. 14 is a flow diagram illustrating yet another example of a method for redirecting a user equipment (UE) from a first network to a second network. The method may be performed a UE 402, such as UEs 102a, 102b, 202a1, 202b1, 202a2, and 202b2. The wireless access point (AP) may be a wireless AP 310, such as neutral-host (NH) APs 110, 210a, and 210b.

The UE 402 may receive, at 1401, a redirection message that redirects the UE 402 from a first network to a second network. The UE 402 may receive the redirection message using a transceiver 452. In one configuration, the redirection message includes band information 464 for each of a plurality of mobile network operator (MNO) partners of the first network.

In another configuration, the redirection message does not include band information 464. The UE 402 may determine, at 1403, band information 464 from the second network. The UE 402 may determine the band information 464 using a band determiner 458. The UE 402 may determine the band information 464 based on one or more of a configuration of the UE 402, a band support table, bands related to the UE's 402 location, signal strength measurements, and/or information included in the redirection message regarding band information 464 for each of a plurality of MNO partners of the first network.

The UE 402 may redirect, at 1405, to the second network based on the determined band information 464. The UE 402 may redirect to the second network using the transceiver 452.

Figure 15:
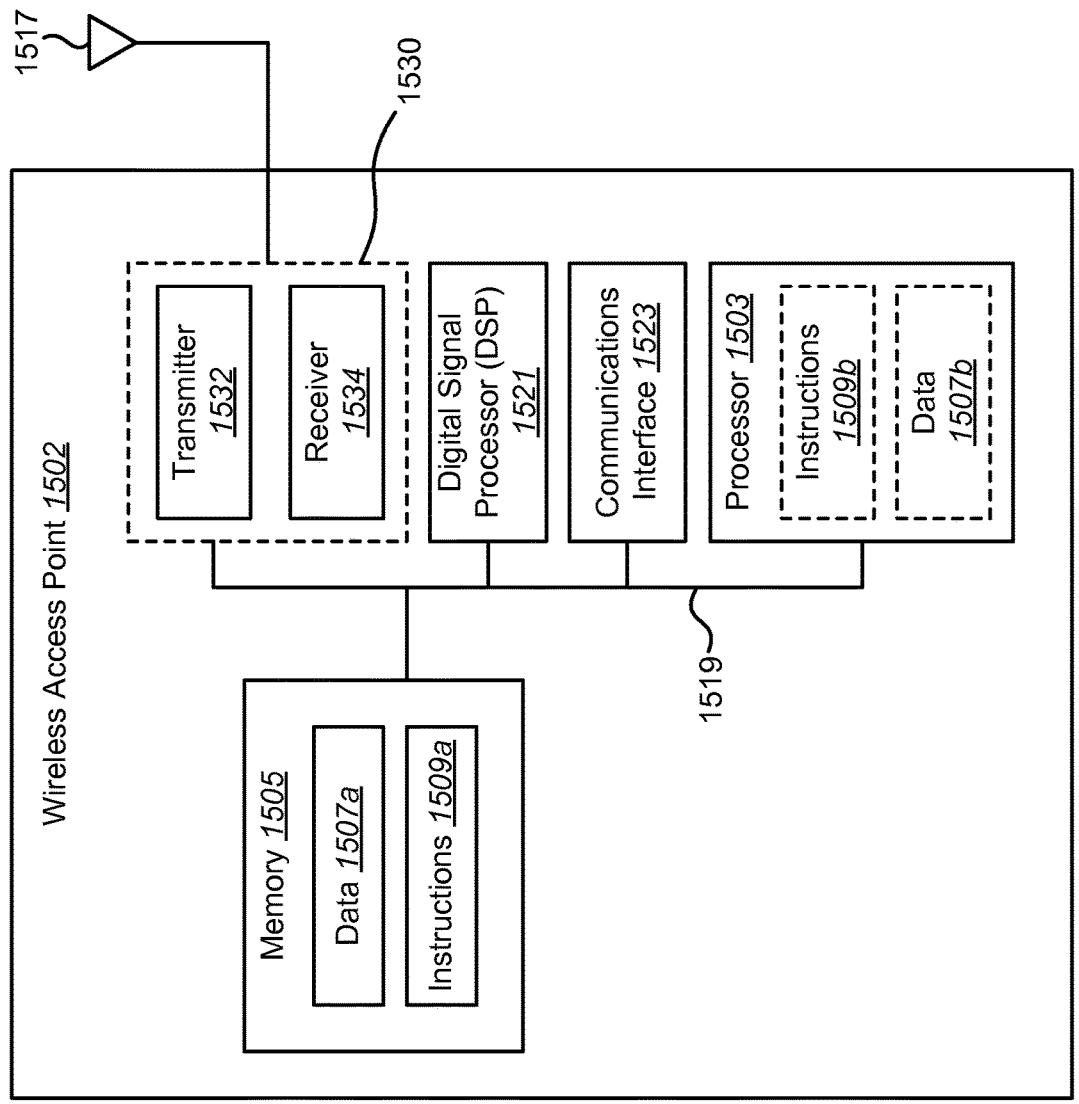
FIG. 15 shows certain components that may be included in a wireless access point.

FIG. 15 shows certain components that may be included in a wireless access point 1502. The wireless access point 1502 described in connection with FIG. 15 may be an example of and/or may be implemented in accordance with one or more of the devices 110, 210a, 210b, and 310 described in connection with one or more of FIGS. 1-13.

The wireless access point 1502 includes a processor 1503. The processor 1503 may be a general purpose single- or multi-chip microprocessor (e.g., an Advanced RISC (Reduced Instruction Set Computer) Machine (ARM)), a special purpose microprocessor (e.g., a digital signal processor (DSP) or an application-specific integrated circuit (ASIC)), a microcontroller, a programmable gate array, etc. The processor 1503 may be referred to as a central processing unit (CPU). Although just a single processor 1503 is shown in the wireless access point 1502 of FIG. 15, in an alternative configuration, a combination of processors 1503 (e.g., an ARM and DSP) could be used.

The wireless access point 1502 also includes memory 1505 in electronic communication with the processor 1503 (i.e., the processor 1503 can read information from and/or write information to the memory 1505). The memory 1505 may be any electronic component capable of storing electronic information. The memory 1505 may be configured as random access memory (RAM), read-only memory (ROM), magnetic disk storage media, optical storage media, flash memory devices in RAM, on-board memory included with the processor 1503, EPROM memory, EEPROM memory, registers and so forth, including combinations thereof. Memory 1505 can be entirely on-board processor 1503, entirely separate from processor 1503, or one or more portions of memory 1505 may be on-board processor 1503 while the remaining portion(s) of the memory 1505 may be separate from processor 1503.

Data 1507a and instructions 1509a may be stored in the memory 1505. The instructions 1509a may include one or more programs, routines, sub-routines, functions, procedures, code, etc. The instructions 1509a may include a single computer-readable statement or many computer-readable statements. The instructions 1509a may be executable by the processor 1503 to implement the methods disclosed herein, for example, in FIGS. 5-12. In addition, the instructions 1509a may be executable by the processor 1503 to implement the functions performed by, for example, the information determiner 336 and/or the network selector 338. Executing the instructions 1509a may involve the use of the data 1507a that is stored in the memory 1505. The data 1507a may include, for example, MNO network information 342 (including PLMN ID 344 and/or band information 346), access terminal mappings 343, a range of physical cell identifiers 348, and/or an operations and management configuration file 350. When the processor 1503 executes the instructions 1509, various portions of the instructions 1509b may be loaded onto the processor 1503, and various pieces of data 1507b may be loaded onto the processor 1503.

The wireless access point 1502 may also include a transmitter 1532 and a receiver 1534 to allow transmission and reception of signals to and from the wireless access point 1502 via an antenna 1517. The transmitter 1532 and receiver 1534 may be collectively referred to as a transceiver 1530. The transceiver 1530 may perform the functions associated with, for example, the transceiver 330. The wireless access point 1502 may also include (not shown) multiple transmitters, multiple antennas, multiple receivers and/or multiple transceivers.

The wireless access point 1502 may include a digital signal processor (DSP) 1521. The wireless access point 1502 may also include a communications interface 1523. The communications interface 1523 may allow a user to interact with the wireless access point 1502.

The various components of the wireless access point 1502 may be coupled together by one or more buses, which may include a power bus, a control signal bus, a status signal bus, a data bus, etc. For the sake of clarity, the various buses are illustrated in FIG. 15 as a bus system 1519.

Figure 16:
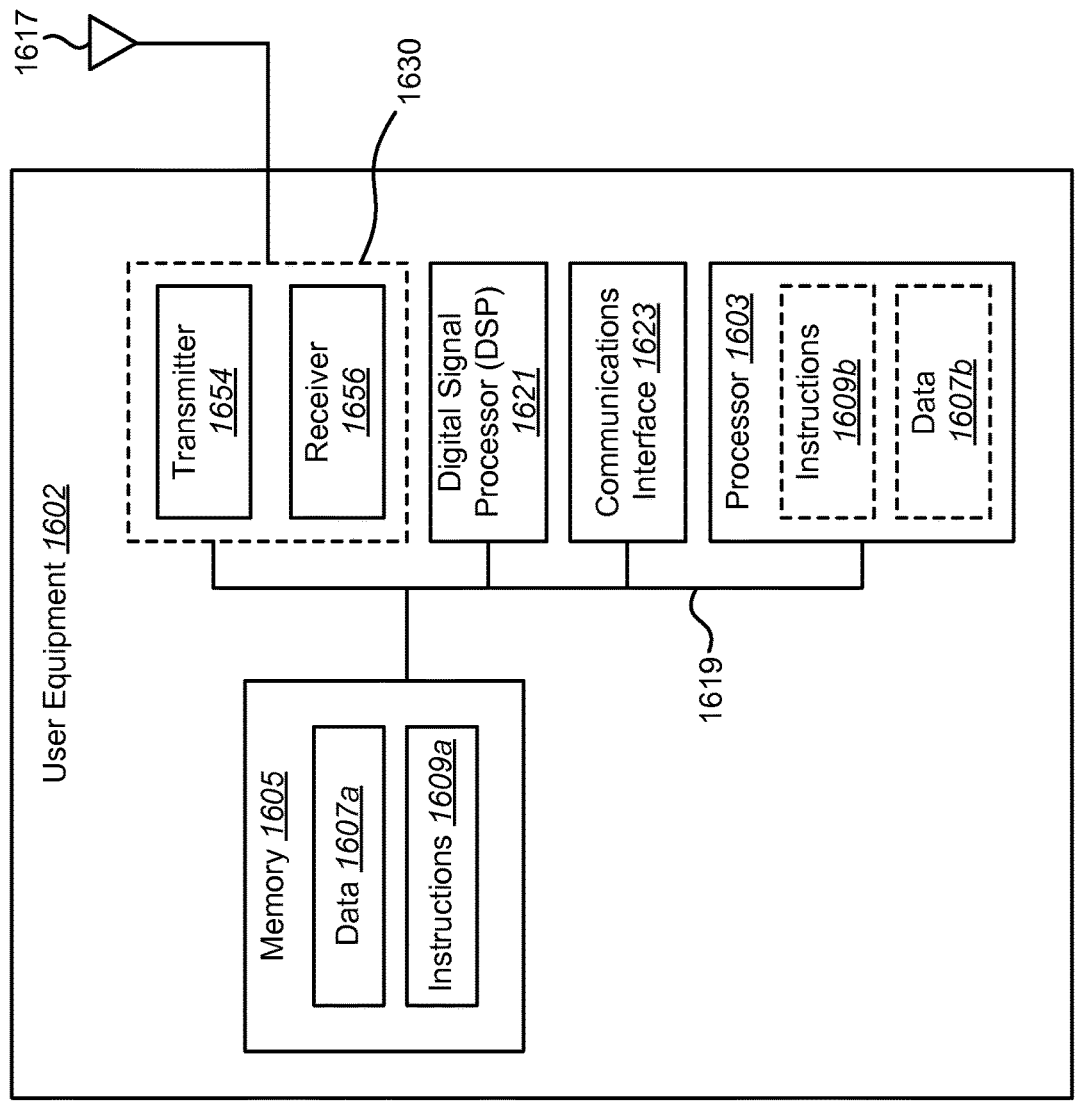
FIG. 16 shows certain components that may be included in a user equipment.

FIG. 16 shows certain components that may be included in a user equipment (UE) 1602. The UE 1602 described in connection with FIG. 16 may be an example of and/or may be implemented in accordance with one or more of UEs 102a, 102b, 202a1, 202b1, 202a2, 202b2, and 402 described in connection with one or more of FIGS. 1-13.

The UE 1602 includes a processor 1603. The processor 1603 may be a general purpose single- or multi-chip microprocessor (e.g., an Advanced RISC (Reduced Instruction Set Computer) Machine (ARM)), a special purpose microprocessor (e.g., a digital signal processor (DSP) or an application-specific integrated circuit (ASIC))), a microcontroller, a programmable gate array, etc. The processor 1603 may be referred to as a central processing unit (CPU). Although just a single processor 1603 is shown in the UE 1602 of FIG. 16, in an alternative configuration, a combination of processors 1603 (e.g., an ARM and DSP) could be used.

The UE 1602 also includes memory 1605 in electronic communication with the processor 1603 (i.e., the processor 1603 can read information from and/or write information to the memory 1605). The memory 1605 may be any electronic component capable of storing electronic information. The memory 1605 may be configured as random access memory (RAM), read-only memory (ROM), magnetic disk storage media, optical storage media, flash memory devices in RAM, on-board memory included with the processor 1603, EPROM memory, EEPROM memory, registers and so forth, including combinations thereof. Memory 1605 can be entirely on-board processor 1603, entirely separate from processor 1603, or one or more portions of memory 1605 may be on-board processor 1603 while the remaining portion(s) of the memory 1605 may be separate from processor 1603.

Data 1607a and instructions 1609a may be stored in the memory 1605. The instructions 1609a may include one or more programs, routines, sub-routines, functions, procedures, code, etc. The instructions 1609a may include a single computer-readable statement or many computer-readable statements. The instructions 1609a may be executable by the processor 1603 to implement the methods disclosed herein, for example, in FIGS. 13-14. In addition, the instructions 1609a may executable by the processor 1603 to implement the functions performed by, for example, the band determiner 458. Executing the instructions 1609a may involve the use of the data 1607a that is stored in the memory 1605. The data 1607a may include, for example, MNO network information 460 (including PLMN ID 462 and/or band information 464), handover information 466, and/or measurement data 468. When the processor 1603 executes the instructions 1609, various portions of the instructions 1609b may be loaded onto the processor 1603, and various pieces of data 1607b may be loaded onto the processor 1603.

The UE 1602 may also include a transmitter 1654 and a receiver 1656 to allow transmission and reception of signals to and from the UE 1602 via an antenna 1617. The transmitter 1654 and receiver 1656 may be collectively referred to as a transceiver 1630. The transceiver 1630 may perform the functions associated with, for example, the transceiver 452. The UE 1602 may also include (not shown) multiple transmitters, multiple antennas, multiple receivers and/or multiple transceivers.

The UE 1602 may include a digital signal processor (DSP) 1621. The UE 1602 may also include a communications interface 1623. The communications interface 1623 may allow a user to interact with the UE 1602.

The various components of the UE 1602 may be coupled together by one or more buses, which may include a power bus, a control signal bus, a status signal bus, a data bus, etc. For the sake of clarity, the various buses are illustrated in FIG. 16 as a bus system 1619.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

It should be noted that one or more of the features, functions, procedures, components, elements, structures, etc., described in connection with any one of the configurations described herein may be combined with one or more of the functions, procedures, components, elements, structures, etc., described in connection with any of the other configurations described herein, where compatible. In other words, any compatible combination of the functions, procedures, components, elements, etc., described herein may be implemented in accordance with the systems and methods disclosed herein.

The functions described herein may be stored as one or more instructions on a processor-readable or computer-readable medium. The term "computer-readable medium" refers to any available medium that can be accessed by a computer or processor. By way of example, and not limitation, such a medium may comprise Random-Access Memory (RAM), Read-Only Memory (ROM), Electrically Erasable Programmable Read-Only Memory (EEPROM), flash memory, Compact Disc Read-Only Memory (CD-ROM) or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical ° disc, digital versatile disc (DVD), floppy disk, and Blu-ray disc, where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code, or data that is/are executable by a computing device or processor.

Software or instructions may also be transmitted over a transmission medium. For example, if the software is transmitted from a website, server or other remote source using a coaxial cable, fiber optic cable, twisted pair, digital subscriber line (DSL) or wireless technologies such as infrared, radio and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as illustrated by FIGS. 5-13, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the systems, methods, and apparatus described herein without departing from the scope of the claims.

What is claimed is:

1. A method for redirecting a user equipment (UE) from a neutral-host (NH) network to a primary mobile network operator (MNO) network of the UE, comprising:
   determining, at a wireless access point of the NH network, information for the UE about one or more MNO networks that do not directly interact with the NH network;
   selecting the primary MNO network for redirection from among the one or more MNO networks based on the determined information;
   sending a redirection message to the UE that redirects the UE from the NH network to the primary MNO network when handover is unsupported between the NH network and the primary MNO network because the NH network and primary MNO network do not directly interact, wherein the redirection message provides information for the UE to reconnect to the primary MNO network; and
   sending a second redirection message to a second UE, wherein the second redirection message redirects the second UE to a third network from among the one or more MNO networks.

2. The method of claim 1, wherein determining information for the UE about the one or more MNO networks comprises:
   receiving a message from the UE that includes a public land mobile network identifier (PLMN ID) of the primary MNO network; and
   maintaining a mapping between the UE and the PLMN ID of the primary MNO network.

3. The method of claim 2, wherein the message comprises a UE capability information message, and wherein the UE capability information message includes band information of the primary MNO network.

4. The method of claim 2, wherein selecting the primary MNO network for redirection from among the one or more MNO networks comprises selecting the primary MNO network based on the received PLMN ID.

5. The method of claim 1, wherein determining information for the UE about the one or more MNO networks comprises:
   receiving, from the UE, handover information regarding a previously visited network of the UE;
   extracting information about a MNO network from the handover information; and
   maintaining a mapping between the UE and the extracted information.

6. The method of claim 1, wherein determining information for the UE about the one or more MNO networks comprises:
   receiving a handover request from the primary MNO network when the UE moves from the primary MNO network to the NH network;
   extracting information about a MNO network from the handover request; and
   maintaining a mapping between the UE and the extracted information.

7. The method of claim 1, wherein determining information for the UE about the one or more MNO networks comprises:
   listening for messages broadcast by one or more neighboring wireless access points; and
   identifying one or more of the one or more neighboring access points as macro access points based on whether a neighboring access point broadcasts a message that includes a physical cell identifier (PCI) that is within a range of PCIs associated with macro access points.

8. The method of claim 1, wherein determining information for the UE about the one or more MNO networks comprises:
   receiving a measurement report from the UE; and
   determining information about one or more neighboring cells based on the measurement report.

9. The method of claim 1, wherein determining information for the UE about the one or more MNO networks comprises:
   provisioning the wireless access point with an operations and management (OAM) configuration file; and
   determining band information regarding the one or more MNO networks based on the OAM configuration file.

10. The method of claim 1, wherein determining information for the UE about the one or more MNO networks comprises:
    receiving, at the wireless access point, information from the UE regarding the one or more MNO networks;
    determining, at the wireless access point, additional information about the one or more MNO networks; and
    combining the information from the UE with the additional information determined at the wireless access point.

11. The method of claim 10, wherein the information from the UE comprises a PLMN ID for the primary MNO network, and wherein the additional information comprises band information for the primary MNO network.

12. The method of claim 1, wherein selecting the primary MNO network from among the one or more MNO networks comprises determining that the UE is associated with the primary MNO network based on the determined information.

13. The method of claim 1, wherein the NH network comprises a Long-Term Evolution (LTE) network.

14. A wireless access point of a neutral-host (NH) network, comprising:
    an information determiner configured to determine information for a user equipment (UE) about one or more mobile network operator (MNO) networks that do not directly interact with the NH network;
    a network selector configured to select a primary MNO network of the UE for redirection from among the one or more MNO networks based on the determined information; and
    a transceiver configured to:
        send a redirection message to the UE that redirects the UE from the NH network to the primary MNO network when handover is unsupported between the NH network and the primary MNO network because the NH network and primary MNO network do not directly interact, wherein the redirection message provides information for the UE to reconnect to the primary MNO network, and send a second redirection message to a second UE, wherein the second redirection message redirects the second UE to a third network from among the one or more MNO networks.

15. The wireless access point of claim 14, wherein determining information for the UE about the one or more MNO networks comprises:
   receiving a message from the UE that includes a public land mobile network identifier (PLMN ID) of the primary MNO network; and
   maintaining a mapping between the UE and the PLMN ID of the primary MNO network.

16. The wireless access point of claim 14, wherein determining information for the UE about the one or more MNO networks comprises:
   receiving, from the UE, handover information regarding a previously visited network of the UE;
   extracting information about a MNO network from the handover information; and
   maintaining a mapping between the UE and the extracted information.

17. The wireless access point of claim 14, wherein determining information for the UE about the one or more MNO networks comprises:
   receiving a handover request from the primary MNO network when the UE moves from the primary MNO network to the NH network;
   extracting information about a MNO network from the handover request; and
   maintaining a mapping between the UE and the extracted information.

18. The wireless access point of claim 14, wherein determining information for the UE about the one or more MNO networks comprises:
   listening for messages broadcast by one or more neighboring access points; and
   identifying one or more of the one or more neighboring access points as macro access points based on whether a neighboring access point broadcasts a message that includes a physical cell identifier (PCI) that is within a range of PCIs associated with macro access points.

19. The wireless access point of claim 14, wherein determining information for the UE about the one or more MNO networks comprises:
   receiving a measurement report from the UE; and
   determining information about one or more neighboring cells based on the measurement report.

20. The wireless access point of claim 14, wherein determining information for the UE about the one or more MNO networks comprises:
   provisioning the wireless access point with an operations and management (OAM) configuration file; and
   determining band information regarding the one or more MNO networks based on the OAM configuration file.

21. The wireless access point of claim 14, wherein determining information for the UE about the one or more MNO networks comprises:
   receiving, at the wireless access point, information from the UE regarding the one or more MNO networks;
   determining, at the wireless access point, additional information about the one or more MNO networks; and
   combining the information from the UE with the additional information determined at the wireless access point.

22. A wireless access point of a neutral-host (NH) network, comprising:
   means for determining information for a user equipment (UE) about one or more mobile network operator (MNO) networks that do not directly interact with the NH network;
   means for selecting a primary MNO network of the UE for redirection from among the one or more MNO networks based on the determined information;
   means for sending a redirection message to the UE that redirects the UE from the NH network to the primary MNO network when handover is unsupported between the NH network and the primary MNO network because the NH network and primary MNO network do not directly interact, wherein the redirection message provides information for the UE to reconnect to the primary MNO network; and
   means for sending a second redirection message to a second UE, wherein the second redirection message redirects the second UE to a third network from among the one or more MNO networks.

23. The wireless access point of claim 22, wherein the means for determining information for the UE about the one or more MNO networks comprises:
   means for receiving a from the UE that includes a public land mobile network identifier (PLMN ID) of the primary MNO network; and
   means for maintaining a mapping between the UE and the PLMN ID of the primary MNO network.

24. The wireless access point of claim 22, wherein the means for determining information for the UE about the one or more MNO networks comprises:
   means for receiving, from the UE, handover information regarding a previously visited network of the UE;
   means for extracting information about a MNO network from the handover information; and
   means for maintaining a mapping between the UE and the extracted information.

25. The wireless access point of claim 22, wherein determining information for the UE about the one or more MNO networks comprises:
   means for receiving a handover request from the primary MNO network when the UE moves from the primary MNO network to the NH network;
   means for extracting information about a MNO network from the handover request; and
   means for maintaining a mapping between the UE and the extracted information.

26. The wireless access point of claim 22, wherein the means for determining information for the UE about the one or more MNO networks comprises:
   means for listening for messages broadcast by one or more neighboring access points; and
   means for identifying one or more of the one or more neighboring access points as macro access points based on whether a neighboring access point broadcasts a message that includes a physical cell identifier (PCI) that is within a range of PCIs associated with macro access points.

27. The wireless access point of claim 22, wherein the means for determining information for the UE about the one or more MNO networks comprises:
   means for receiving a measurement report from the UE; and
   means for determining information about one or more neighboring cells based on the measurement report.

28. The wireless access point of claim 22, wherein the means for determining information for the UE about the one or more MNO networks comprises:

means for provisioning the wireless access point with an operations and management (OAM) configuration file; and means for determining band information regarding the one or more MNO networks based on the OAM configuration file.

29. The wireless access point of claim 22, wherein the means for determining information for the UE about the one or more MNO networks comprises:

means for receiving, at the wireless access point, information from the UE regarding the one or more MNO networks;

means for determining, at the wireless access point, additional information about the one or more MNO networks; and means for combining the information from the UE with the additional information determined at the wireless access point.

30. A non-transitory computer-readable medium comprising codes executable by one or more processors for causing an apparatus to:

determine, at a wireless access point of a neutral-host (NH) network, information for a user equipment (UE) about one or more mobile network operator (MNO) networks that do not directly interact with the NH network;

select a primary MNO network for redirection from among the one or more MNO networks based on the determined information;

send a redirection message to the UE that redirects the UE from the NH network to the primary MNO network when handover is unsupported between the NH network and the primary MNO network because the NH network and primary MNO network do not directly interact, wherein the redirection message provides information for the UE to reconnect to the primary MNO network, and send a second redirection message to a second UE, wherein the second redirection message redirects the second UE to a third network from among the one or more MNO networks.

31. The non-transitory computer-readable medium of claim 30, wherein the codes for causing the apparatus to determine information for the UE about the one or more MNO networks comprises codes for causing the one or more processors to:

receive a message from the UE that includes a public land mobile network identifier (PLMN ID) of the primary MNO network; and maintain a mapping between the UE and the PLMN ID of the primary MNO network.

32. The non-transitory computer-readable medium of claim 30, wherein the codes for causing the apparatus to determine information for the UE about the one or more MNO networks comprises codes for causing the apparatus to:

receive, from the UE, handover information regarding a previously visited network of the UE;

extract information about a MNO network from the handover information; and maintain a mapping between the UE and the extracted information.

33. The non-transitory computer-readable medium of claim 30, wherein the codes for causing the apparatus to determine information for the UE about the one or more MNO networks comprises codes for causing the apparatus to:

receive a handover request from the primary MNO network when the UE moves from the primary MNO network to the NH network;

extract information about a MNO network from the handover request; and maintain a mapping between the UE and the extracted information.

34. The non-transitory computer-readable medium of claim 30, wherein the codes for causing the apparatus to determine information for the UE about the one or more MNO networks comprises codes for causing the apparatus to:

listen for messages broadcast by one or more neighboring access points; and identify one or more of the one or more neighboring access points as macro access points based on whether a neighboring access point broadcasts a message that includes a physical cell identifier (PCI) that is within a range of PCIs associated with macro access points.

35. The non-transitory computer-readable medium of claim 30, wherein the codes for causing the apparatus to determine information for the UE about the one or more MNO networks comprises codes for causing the apparatus to:

receive a measurement report from the UE; and determine information about one or more neighboring cells based on the measurement report.

36. The non-transitory computer-readable medium of claim 30, wherein the codes for causing the apparatus to determine information for the UE about the one or more MNO networks comprises codes for causing the apparatus to:

provision the wireless access point with an operations and management (OAM) configuration file; and determine band information regarding the one or more MNO networks based on the OAM configuration file.

37. The non-transitory computer-readable medium of claim 30, wherein the codes for causing the apparatus to determine information for the UE about the one or more MNO networks comprises codes for causing the apparatus to:

receive, at a wireless access point, information from the UE regarding the one or more MNO networks;

determine, at the wireless access point, additional information about the one or more MNO networks; and combine the information from the UE with the additional information determined at the wireless access point.

* * * * *